US012119941B2

(12) United States Patent
Nishio et al.

(10) Patent No.: US 12,119,941 B2
(45) Date of Patent: Oct. 15, 2024

(54) TERMINAL, BASE STATION, RECEIVING METHOD, AND TRANSMITTING METHOD

(71) Applicant: Panasonic Intellectual Property Corporation of America, Torrance, CA (US)

(72) Inventors: Akihiko Nishio, Osaka (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 336 days.

(21) Appl. No.: 17/604,983

(22) PCT Filed: Apr. 20, 2020

(86) PCT No.: PCT/JP2020/017008
§ 371 (c)(1),
(2) Date: Oct. 19, 2021

(87) PCT Pub. No.: WO2020/218231
PCT Pub. Date: Oct. 29, 2020

(65) Prior Publication Data
US 2022/0216952 A1    Jul. 7, 2022

(30) Foreign Application Priority Data
Apr. 25, 2019 (JP) ................. 2019-084513

(51) Int. Cl.
*H04L 1/1829* (2023.01)
*H04L 1/1607* (2023.01)
(Continued)

(52) U.S. Cl.
CPC .......... *H04L 1/1835* (2013.01); *H04L 1/1621* (2013.01); *H04L 1/1854* (2013.01); *H04W 28/04* (2013.01); *H04W 72/23* (2023.01)

(58) Field of Classification Search
None
See application file for complete search history.

(56) References Cited

U.S. PATENT DOCUMENTS

| 11,271,687 B2 * | 3/2022 | Fröberg Olsson .... H04L 1/1835 |
| 2006/0092973 A1 * | 5/2006 | Petrovic ................ H04L 1/1841 370/208 |

(Continued)

FOREIGN PATENT DOCUMENTS

| JP | 2005-529518 A | 9/2005 |
| JP | 2008-516529 A | 5/2008 |

(Continued)

OTHER PUBLICATIONS

International Search Report, mailed Jul. 14, 2020, for International Application No. PCT/JP2020/017008, 7 pages. (with English translation).

(Continued)

*Primary Examiner* — Anh Vu H Ly
(74) *Attorney, Agent, or Firm* — Seed IP Law Group LLP

(57) ABSTRACT

The present invention implements appropriate retransmission control processing in accordance with a radio propagation environment. This terminal is provided with a reception circuit for receiving control information relating to buffering for retransmission control, and a control circuit for controlling buffering on the basis of the control information.

14 Claims, 14 Drawing Sheets

(51) Int. Cl.
 *H04W 28/04* (2009.01)
 *H04W 72/23* (2023.01)

(56) References Cited

U.S. PATENT DOCUMENTS

| | | |
|---|---|---|
| 2006/0107166 A1 | 5/2006 | Nanda |
| 2009/0086657 A1* | 4/2009 | Alpert .................. H04L 1/1877 370/310 |
| 2016/0088635 A1* | 3/2016 | Davydov ............. H04L 1/1812 370/329 |
| 2016/0192383 A1* | 6/2016 | Hwang ................ H04L 1/0067 370/330 |
| 2016/0227540 A1* | 8/2016 | Chen .................... H04L 5/0064 |
| 2017/0264398 A1 | 9/2017 | Uchino et al. |
| 2018/0295634 A1* | 10/2018 | Nagura .................. H04W 4/24 |
| 2019/0181990 A1* | 6/2019 | Yasukawa ............. H04W 72/23 |
| 2019/0319751 A1* | 10/2019 | Chen ..................... H04L 1/1812 |
| 2023/0291507 A1* | 9/2023 | Amuru .................. H04W 72/23 370/329 |

FOREIGN PATENT DOCUMENTS

| | | |
|---|---|---|
| WO | 03/104919 A2 | 12/2003 |
| WO | 2016/121809 A1 | 8/2016 |

OTHER PUBLICATIONS

3GPP TR 38.811 V15.0.0, "3rd Generation Partnership Project; Technical Specification Group Radio Access Network; Study on New Radio (NR) to support non terrestrial networks (Release 15)," Jun. 2018, 118 pages.

* cited by examiner

| HEADER | HEADER | HEADER | HEADER |
|--------|--------|--------|--------|
| ACK/NACK INFORMATION | ACK/NACK INFORMATION | ACK/NACK INFORMATION | ACK/NACK INFORMATION |

HEADER EXAMPLE 1
0: INDICATION METHOD 1
1: INDICATION METHOD 2

HEADER EXAMPLE 2
00: INDICATION METHOD 1
01: NO NACK (or NO ALLOCATION)
10: INDICATION METHOD 2 NUMBER OF NACKs IS LESS THAN M1
11: INDICATION METHOD 2 NUMBER OF NACKs IS EQUAL TO OR GREATER THAN M1

FIG. 15

TERMINAL, BASE STATION, RECEIVING METHOD, AND TRANSMITTING METHOD

TECHNICAL FIELD

The present disclosure relates to a terminal, a base station, a receiving method and a transmitting method.

BACKGROUND ART

In the standardization of 5G, New Radio access technology (NR) was discussed in 3GPP and the NR Release 15 (Rel. 15) specification was published.

CITATION LIST

Non-Patent Literature

NPL 1

3GPP, TR38.811 V15.0.0, "Study on New Radio (NR) to support non terrestrial networks (Release 15)", 2018-06

SUMMARY OF INVENTION

However, there is a room to study about appropriate retransmission control processing in accordance with a radio propagation environment.

A non-limiting and exemplary embodiment facilitates providing a terminal, a base station, a receiving method and a transmitting method capable of realizing appropriate retransmission control processing in accordance with a radio propagation environment.

In an embodiment, the techniques disclosed here feature a terminal including: reception circuitry, which, in operation, receives control information on buffering of data relating to a retransmission request; and control circuitry which, in operation, controls the buffering based on the control information.

It should be noted that general or specific embodiments may be implemented as a system, an apparatus, a method, an integrated circuit, a computer program, a storage medium, or any selective combination thereof.

According to an embodiment of the present disclosure, it is possible to realize appropriate retransmission control processing in accordance with a radio propagation environment.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 15 is a diagram illustrating another example of indication information of ACK/NACK according to Embodiment 3.

DESCRIPTION OF EMBODIMENTS

Figure 1:
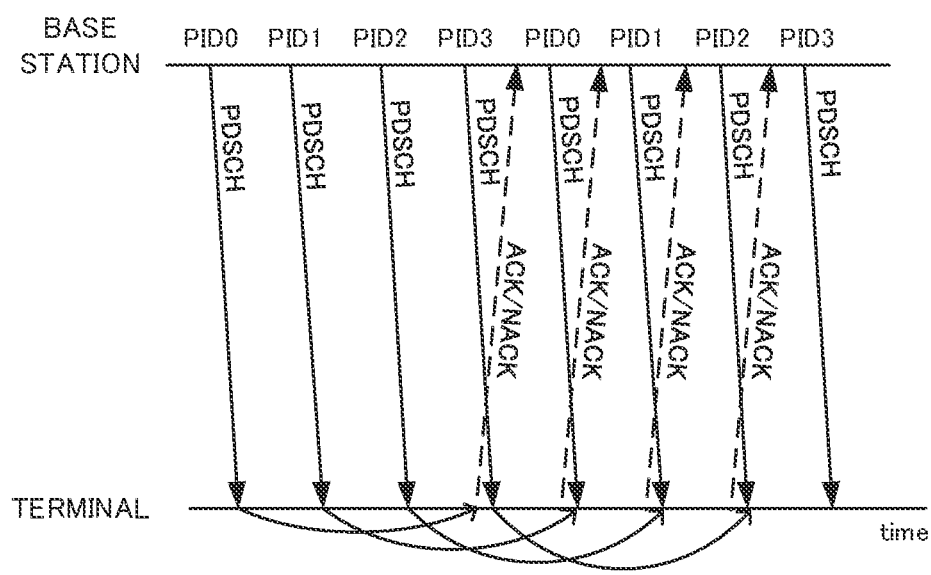
FIG. 1 is a diagram illustrating exemplary operations of HARQ.

Embodiments of the present disclosure will be described in detail below by referring to the drawings.
[Extension to Non-Terrestrial Network (NTN)]

NR is being studied for extension to Non-Terrestrial Networks (NTNs) such as a communication using a satellite and/or a High-altitude platform station (RAPS) (e.g., NPL 1).

In an NTN environment, a coverage area (e.g., one or more cells) of a satellite for a terrestrial terminal (also called as a UE (User Equipment)) or an aircraft terminal is formed by beams from the satellite. Also, a round trip time of radio wave propagation between the terminal and the satellite is determined by an altitude (e.g., up to about 36,000 km) of the satellite and/or an angle viewed from the terminal.

For example, the satellite forms a cell with a diameter of several hundreds of kilometers. The cell formed by the satellite is larger than a cell with a diameter of several kilometers formed by a terrestrial base station (also called as a gNB, for example) or the like. For example, NPL 1 describes that a propagation delay time between a satellite and a terminal, that is, a round trip propagation time (RTT: Round Trip Time) takes about 544 ms at most in arm NTN.
[HARQ]

In LTE or NR, for example, HARQ (hybrid automatic repeat request) is applied to retransmission control in data transmission.

In HARQ, a transmitting side performs channel coding (FEC: Forward Error Correction) such as turbo coding or LDPC (Low Density Parity Check) coding on data, for example, and transmits the channel coded data. When there is an error in received data in data decoding, a receiving side saves (in other words, also called as buffers, stores or holds) the received data (e.g., soft determination value) in a buffer.

Note that a buffer is also called as, for example, an HARQ soft buffer or simply a soft buffer. In retransmitting the data, the receiving side combines (soft combines) the received data (in other words, retransmission data or data relating to a retransmission request) and the previously received data (in other words, saved data), and decodes the combined data.

As a result, in HARQ, the receiver side can decode the data using data with an improved received quality SNR (Signal to Noise Ratio)). Also, in HARQ, the transmission side can improve a coding gain by transmitting a parity bit (in other words, a different RV (Redundancy version)) different from that in the previous transmission. Further, in HARQ, a plurality of processes (also called as HARQ processes, for example) can be used to continuously transmit data in view of a propagation path delay or processing delays of the transmitting side and the receiving side (see, for example, FIG. 1). In this case, the receiving side saves the received data in the buffer separately for each process ID (sometimes referred to as "PID") which is identification information for identifying the process (or data).

Furthermore, for example, in LTE or NR, in data allocation, a base station indicates, to a terminal, information on HARQ including a process ID, an NDI (New Data Indicator), an RV and the like. The terminal performs data reception processing (e.g., soft combining processing) based on the information on HARQ indicated from the base station.

On the other hand, for example, an HARQ method for an NTN has not been fully discussed. Since the number of processes in an RTT is increased in an NTN, which is a cell environment with a larger propagation delay (or RTT) as compared with a terrestrial network, an amount of soft buffer (in other words, soft buffer size) included in the receiving side (for example, terminal) may be increased. The increase in the amount of soft buffer may increase, for example, the cost and chip size of the device on the receiving side (terminal).

On the contrary, for example, when the number of processes in an RTT is decreased, an amount of soft buffer included in the receiving side (for example, terminal) can be decreased. However, when the number of processes in the RTT is decreased, the throughput per user (in other words, terminal) (also called as maximum user throughput, for example) may be decreased.

Further, for example, when HARQ (in other words, retransmission in the physical layer or the MAC (Medium Access Control)) is not applied, retransmission of a higher layer (e.g., the RLC (Radio Link Control) layer) is performed. However, in the retransmission of the higher layer, a combining gain is not obtained and a delay becomes larger as compared with HARQ. For example, in the retransmission of the higher layer, the user experience may be degraded due to delays in various network controls or a delay of user data.

Then, in an embodiment of the present disclosure, retransmission control in a case where a propagation delay between a terminal and a base station is larger compared with a terrestrial network environment, such as an NTN environment, will be described. According to an embodiment of the present disclosure, for example, appropriate retransmission control can be realized for each of different data (for example, data of different processes).

Embodiment 1

[Overview of Communication System]

Figure 2:
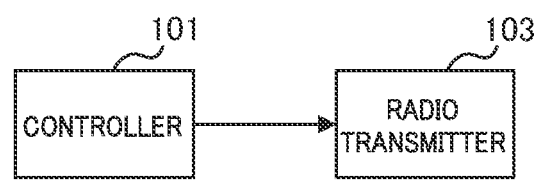
FIG. 2 is a block diagram illustrating an exemplary configuration of a part of a base station according to Embodiment 1.

A communication system according to the present embodiment includes, for example, base station 100 and terminal 200. In the following description, as an example, base station 100 (corresponding to a transmitting apparatus) transmits data (also called as downlink data or a PDSCH (Physical Downlink Shared Channel), for example). Further, terminal 200 (corresponding to a receiving apparatus) receives data and feeds back a response signal for the data. Note that a response signal is also called as an ACK (Acknowledgement)/NACK (Negative acknowledgement) signal or ACK/NACK information, for example, FIG. 2 is a block diagram illustrating an exemplary configuration of a part of base station 100 according to the embodiment of the present disclosure. In base station 100 illustrated in FIG. 2, controller 101 generates control information (e.g., buffer priority information) on buffering for retransmission control. Radio transmitter 103 transmits data and the control information.

Figure 3:
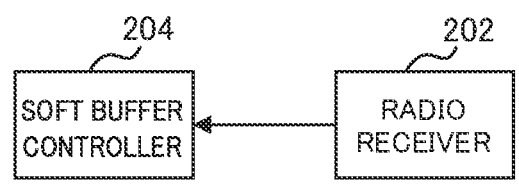
FIG. 3 is a block diagram illustrating an exemplary configuration of a part of a terminal according to Embodiment 1.

FIG. 3 is a block diagram illustrating an exemplary configuration of a part of terminal 200 according to the embodiment of the present disclosure. In terminal 200 illustrated in FIG. 3, radio receiver 202 receives control information (e.g., buffer priority information) on buffering for retransmission control. Soft buffer controller 204 controls the buffering based on the control information.

[Configuration of Base Station]

Figure 4:
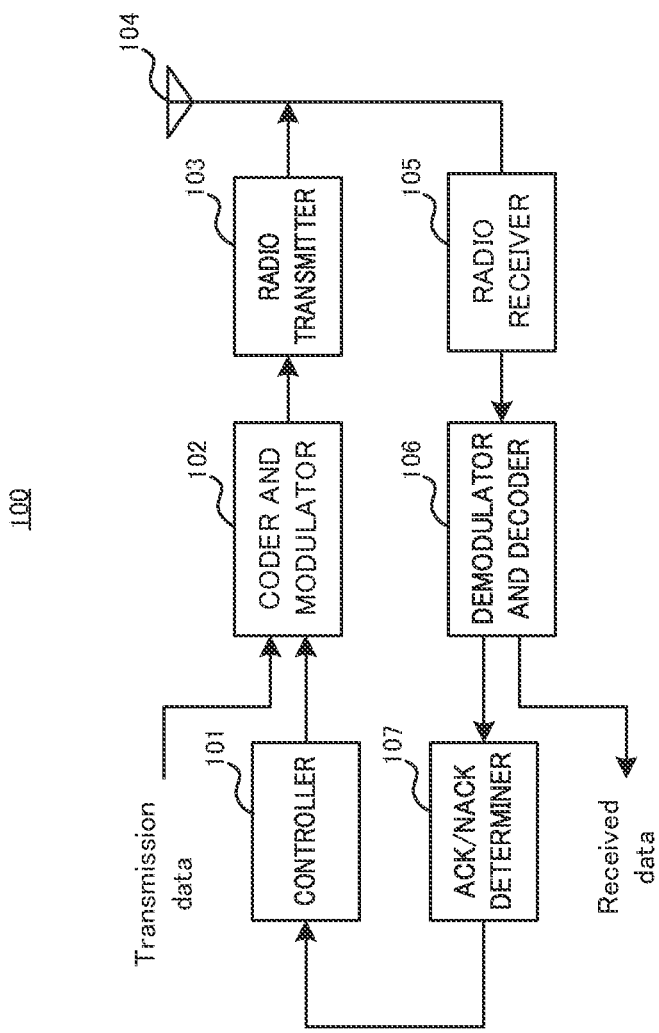
FIG. 4 is a block diagram illustrating an exemplary configuration of the base station according to Embodiment 1.

FIG. 4 is a block diagram illustrating an exemplary configuration of base station 100 according to the present embodiment. Base station 100 includes controller 101, coder and modulator 102, radio transmitter 103, antenna 104, radio receiver 105, demodulator and decoder 106 and ACK/NACK determiner 107, for example.

Controller 101, for example, generates control information (e.g., data allocation information) for terminal 200, and outputs the generated control information to coder and modulator 102. The control information may include allocation information of a time resource and a frequency resource (also called as time and frequency resource allocation information), information on a coding rate and a modulation scheme (also called as MCS (Modulation and Coding Scheme) information, for example), and information on HARQ (also called as HARQ information, for example), for example.

The HARQ information may include a process ID, an NDI and an RV, for example. The HARQ information may also include "buffer priority information (BPF: Buffer Priority Flag)" indicating a priority of buffering in a buffer (e.g., soft buffer 205 illustrated in FIG. 5) included in terminal 200 between a plurality of data (e.g., data of different processes). Note that an example of the BPF will be described later.

Further, controller 101 controls retransmission of transmission data based on the determination result of ACK/NACK input from ACK/NACK determiner 107. For example, controller 101 outputs a retransmission instruction to coder and modulator 102 in a case of a NACK, and outputs a data discard instruction to coder and modulator 102 in a case of an ACK.

Coder and modulator 102 codes (encodes) and modulates input transmission data (for example, data relating to new transmission (simply also called as new data) or the initial transmission data), and outputs the modulated signal to radio transmitter 103. The data may be coded by error correction coding such as turbo code, LDPC code and polar code, for example. The data may be modulated by QPSK (Quadrature Phase Shift Keying), QAM (Quadrature Amplitude Modulation), or the like, for example. Coder and modulator 102 codes and modulates the control information input from controller 101 and outputs the modulated signal to radio transmitter 103.

Further, coder and modulator 102 holds transmitted transmission data, for example, and performs processing similar to the above-described processing on the held data (in other words, retransmission data) when a retransmission instruction is output from controller 101 (in other words, there is an error in the transmission data). In addition, coder and modulator 102 discards the held data, for example, when a data discard instruction is output from controller 101 (in other words, there is no error in the transmission data).

Note that a retransmission unit of transmission data may be a transport block unit, a code block unit, a code block group unit or another data unit, for example.

For example, in LTE or 5G NR, transmission data corresponds to a PDSCH and data allocation information corresponds to DCI (Downlink Control Information) or a PDCCH (Physical Downlink Control Channel).

Radio transmitter 103 performs transmission processing such as D/A conversion, up-conversion and amplification, for example, on the signal input from coder and modulator 102, and transmits the radio signal obtained by performing the transmission processing from antenna 104.

Radio receiver 105 performs reception processing such as down-conversion and A/D conversion on a signal received via, antenna 104 from terminal 200, and outputs the signal after performing the reception processing to demodulator and decoder 106. The Signal from terminal 200 include a data signal (also called as uplink data or a PUSCH (Physical Uplink Shared Channel, for example) and an ACK/NACK signal, for example.

Demodulator and decoder 106 performs, for example, channel estimation, demodulation and decoding processing on the signal input from radio receiver 105. Demodulator and decoder 106 outputs the data signal (in other words, received data) included in the received signal, and outputs the ACK/NACK signal included in the received signal to ACK/NACK determiner 107.

ACK/NACK determiner 107 determines an ACK or HACK for the transmitted transmission data (e.g., transport block or the like) based on the ACK/NACK signal input from demodulator and decoder 106. ACK/NACK determiner 107 outputs the determination result to controller 101.

[Configuration of Terminal]

Figure 5:
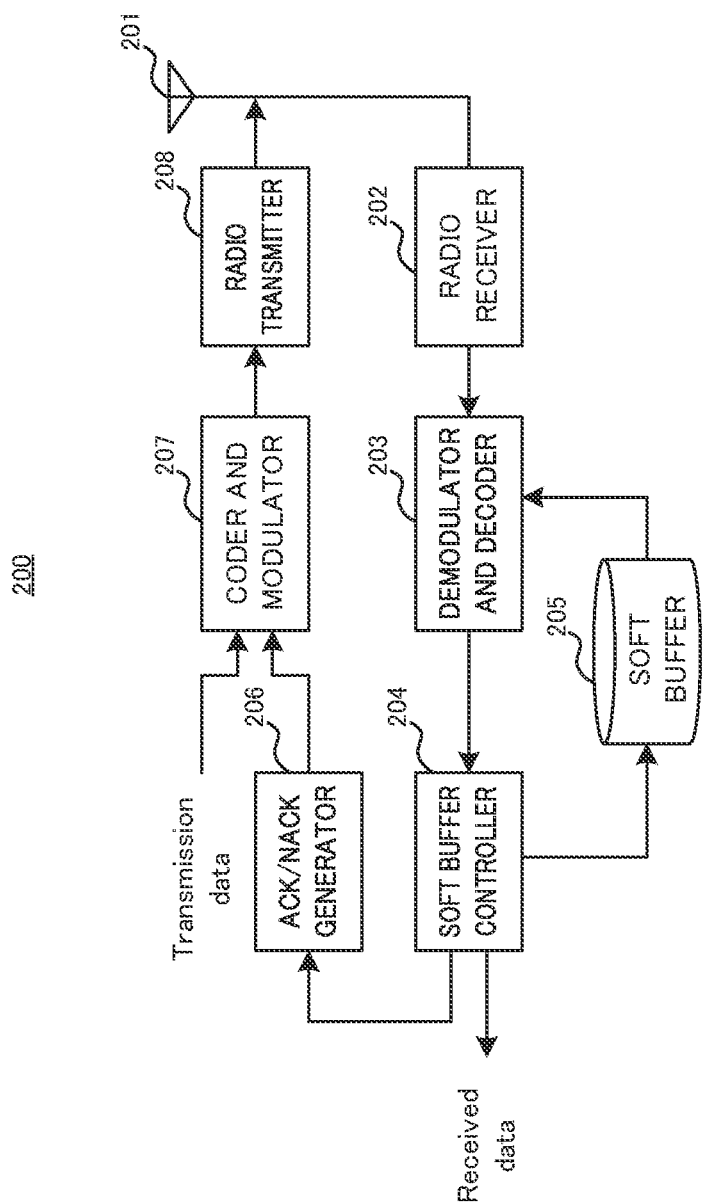
FIG. 5 is a block diagram illustrating an exemplary configuration of the terminal according to Embodiment 1.

FIG. 5 is a block diagram illustrating an exemplary configuration of terminal 200 according to the present embodiment. Terminal 200 includes antenna 201, radio receiver 202, demodulator and decoder 203, soft buffer controller 204, soft buffer 205, ACK/NACK generator 206, coder and modulator 207 and radio transmitter 208, for example.

Radio receiver 202 performs reception processing such as down-conversion and A/D conversion on a signal received via antenna 201 from base station 100, and outputs the received signal (including data and control information, for example) after performing the reception processing to demodulator and decoder 203.

Demodulator and decoder 203 demodulates and error correction decodes the received signal input from radio receiver 202, and outputs the decoded signal to soft buffer controller 204.

For example, demodulator and decoder 203 may demodulate and error correction decode the received data included in the received signal based on a modulation scheme and a coding rate indicated in the control information (e.g., data allocation information) included in the received signal. Demodulator and decoder 203 outputs the decoded signal to soft buffer controller 204.

Further, demodulator and decoder 203 determines whether the received data is new data or retransmission data based on an NDI included in the control information, for example. When the received data is the new data, demodulator and decoder 203, for example, error correction decodes the received data and performs CRC (Cyclic Redundancy Check) determination. When the received data is the retransmission data and data received by the previous reception is saved in soft buffer 205, demodulator and decoder 203 combines the saved data and the data received this time, and then error correction decodes the combined to data. On the other hand, when data received by the previous reception is not saved in soft buffer 205, demodulator and decoder 203 error correction decodes the data received this time without performing combining processing, and performs CRC determination. Furthermore, demodulator and decoder 203 outputs the result of the CRC determination to soft butter controller 204.

When the CRC determination result input from demodulator and decoder 203 is CRC OK (in other words, there is no error), soft buffer controller 204 instructs soft buffer 205 to discard (in other words, Flush) received data saved in the past by a corresponding process ID.

When the CRC determination result is CRC NG (in other words, there is an error), soft buffer controller 204 controls buffering of the received data in soft buffer 205 based on buffer priority information (BPF) included in the signal input from demodulator and decoder 203. For example, soft buffer controller 204 controls save of the received data in soft buffer 205 and discard of the received data based on the BPF. In a case of saving the received data, soft buffer controller 204 instructs soft buffer 205 to save the received data. Note that an example of operations of soft buffer controller 204 will be described later.

Soft buffer controller 204 outputs the CRC determination result input from demodulator and decoder 203 to ACK/NACK generator 206. When the CRC determination result is CRC OK, soft buffer controller 204 outputs the corresponding received data.

Soft buffer 205 is a buffer for saving data (e.g., soft determination value) received in the past by terminal 200. The saved data is used, for example, for HARQ combining Soft buffer 205 saves the received data for each process of HARQ, for example.

Note that in terminal 200, soft buffer 205 does not need to include a buffer corresponding to the number of processes corresponding to an RTT. In other words, a buffer size of soft buffer 205 may be smaller than the buffer size corresponding to the number of processes corresponding to the RTT.

ACK/NAM generator 206 generates an ACK/NACK signal based on the CRC determination result input from soft buffer controller 204. ACK/NACK generator 206 generates an ACK in a case of CRC OK (in a case where there is no error) and generates a NACK in a case of CRC NG (in a case where there is an error), for example. ACK/NACK generator 206 outputs the generated ACK/NACK signal to coder and modulator 207.

Note that when a plurality of transport blocks or code blocks are transmitted, ACK/NACK generator 206 may generate an ACK/NACK signal for each transport block or each code block, and generate an ACK/NACK code block including the plurality of ACK/NACK signals.

Coder and modulator 207 error correction codes and modulates transmission data (in other words, uplink data or a PUSCH), and outputs the modulated signal to radio transmitter 208. Further, coder and modulator 207 error correction codes and modulates the ACK/NAM signal input from ACK/NACK generator 206, and outputs the modulated signal to radio transmitter 208.

Radio transmitter 208 performs transmission processing such as D/A conversion, up-conversion and amplification, for example, on the signal input from coder and modulator 207, and transmits the radio signal obtained by performing the transmission processing from antenna 201.

[Exemplary Operations of Base Station 100 and Terminal 200]

Next, exemplary operations of base station 100 and terminal 200 will be described.

When there is an error in received data (for example, in a case of CRC NG), terminal 200 (in other words, receiving side) saves the received data in soft buffer 205 and waits for retransmission of the corresponding data. On the other hand, when there is no error in received data (for example, in a case of CRC OK), terminal 200 does not need to save the received data in soft buffer 205. In other words, terminal 200 uses soft buffer 205 when there is an error in the received data (e.g., received packet).

Also, for example, a less propagation path variation is assumed in an NTN environment (e.g., an environment for an aircraft or seacraft) compared with a terrestrial network environment. Thus, a lower error rate (also called as BLER (Block Error Rate) or packet error rate, for example) is more likely to be realized in the NTN environment compared with the terrestrial network environment.

Therefore, it is assumed that a case where terminal 200 uses soft buffer 205 (in other words, a case where received data is saved (or combined)) is less in the NTN environment compared with the terrestrial network environment.

For example, terminal 200 may use, on average, a buffer corresponding to the number of processes corresponding to an RTT multiplied by a BUR in soft buffer 205. As an example, when the BLER is 1 and the number of processes corresponding to the MT is 512 (e.g., RTT=512 ms when a TTI (Transmission Time interval) is 1 ms), terminal 200 may use a buffer corresponding to about 6 processes on average.

Thus, in an NTN environment, HARQ can be realized with soft buffer 205 having a size smaller than the soft buffer size corresponding to the number of processes corresponding to the RTT.

Therefore, in the present embodiment, a buffer size of soft buffer 205 may be smaller than, for example, the buffer size corresponding to the number of processes corresponding to the RTT.

However, it is desirable to transmit higher-priority data (data having a higher priority) such as a control packet or important user data with a low delay by a combining gain of HARQ so as not to impair the user experience. In other words, retransmission of the MAC layer or a higher layer in which a combining gain of HARQ is not obtained, for example, may be applied to lower-priority data (data having a lower priority) transmission.

Therefore, in the present embodiment, buffer priority information (BPF) indicating a priority of buffering of data in soft buffer 205 is indicated from base station 100 to terminal 200. In other words, the BPF indicates a priority of use of soft buffer 205 between a plurality of data or a priority of combining processing with HARQ.

For example, in data transmission allocation, base station 100 generates a BPF for allocated data for terminal 200, and indicates the BPF to terminal 200. Based on the BPF terminal 200 controls save of received data in soft buffer 205 (in other words, data combining processing).

Hereinafter, an example of operations of data save in soft buffer 205 according to the present embodiment will be described.

For example, a BPF may be 1-bit information (e.g., 0 or 1). For example, BPF=1 indicates higher-priority data for save in soft buffer 205 and BPF=0 indicates lower-priority data for save in soft buffer 205.

For example, the higher-priority data is data including a control message of a higher layer such as Radio Resource Control (RRC) or data for higher-priority Logical Channel. The lower-priority data may be data involving a stricter delay requirement such as data for a streaming service such as voice data or video data, for example. This is because the need for save in soft buffer 205 is low since retransmission may not be performed for the data involving the stricter delay requirement. Note that the higher-priority data and the lower-priority data are not limited thereto, but may be other types of data.

For example, when there is an error in data decoding of lower-priority data (e.g., BPF=0), terminal 200 saves the received data in soft buffer 205 in a case where there is a free space in soft buffer 205, and discards the received data without saving the received data in soft buffer 205 in a case where there is no free space in soft buffer 205.

Further, for example, when there is an error in data decoding of higher-priority data (e.g., BPF=1), terminal 200 preferentially saves the received data in soft buffer 205.

For example, when soft buffer 205 is all used for other data (in other words, there is no free space), terminal 200 discards saved data corresponding to lower-priority data among the data saved in soft buffer 205 and saves (in other words, overwrites save) the higher-priority data. In other words, when there is no free space in soft buffer 205, terminal 200 overwrites the data having the lower priority than the received data with the received data.

On the other hand, for example, when soft buffer 205 is all used for other data and there is no lower-priority data in the data saved in soft buffer 205, terminal 200 discards the received data.

Figure 6:
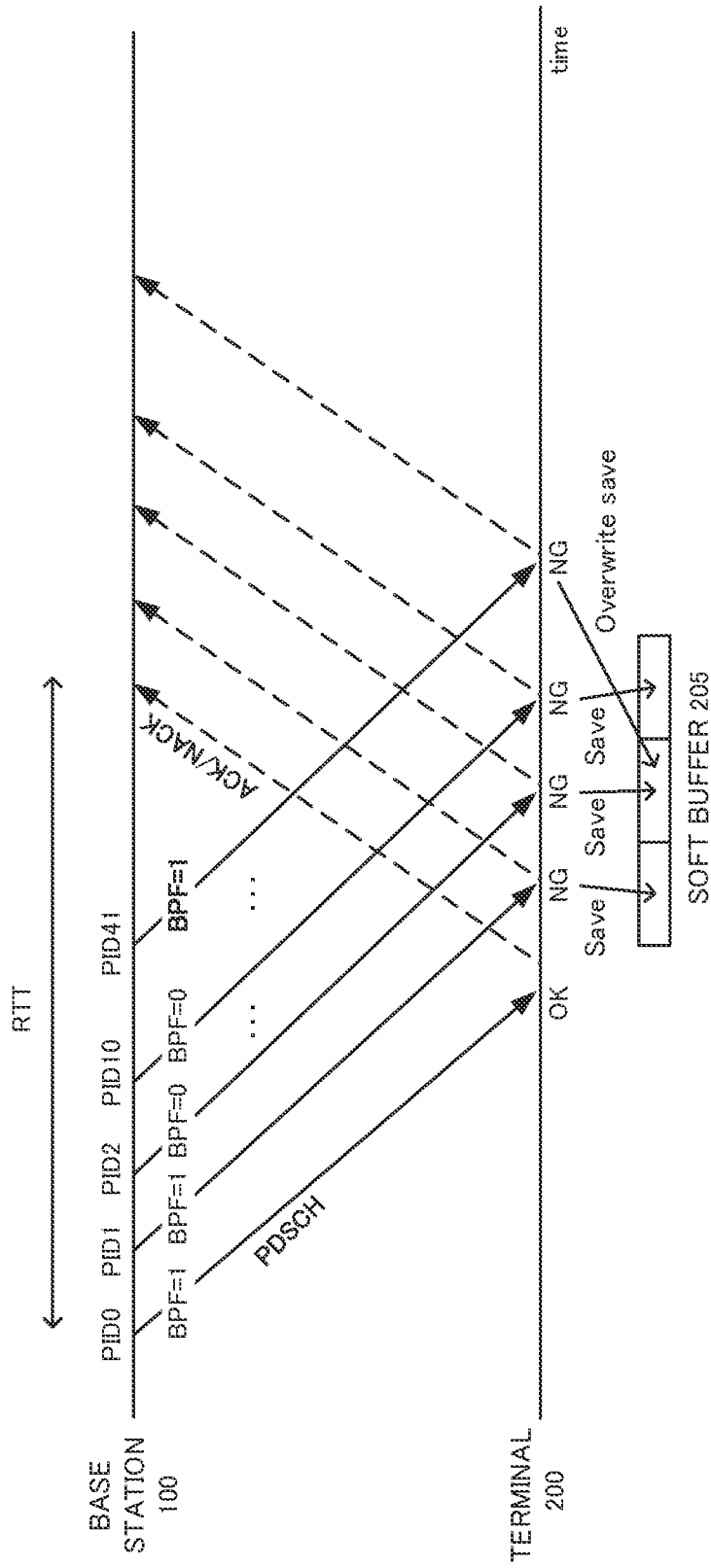
FIG. 6 is a diagram illustrating exemplary operations of a radio communication system according to Embodiment 1.
Figure 7:
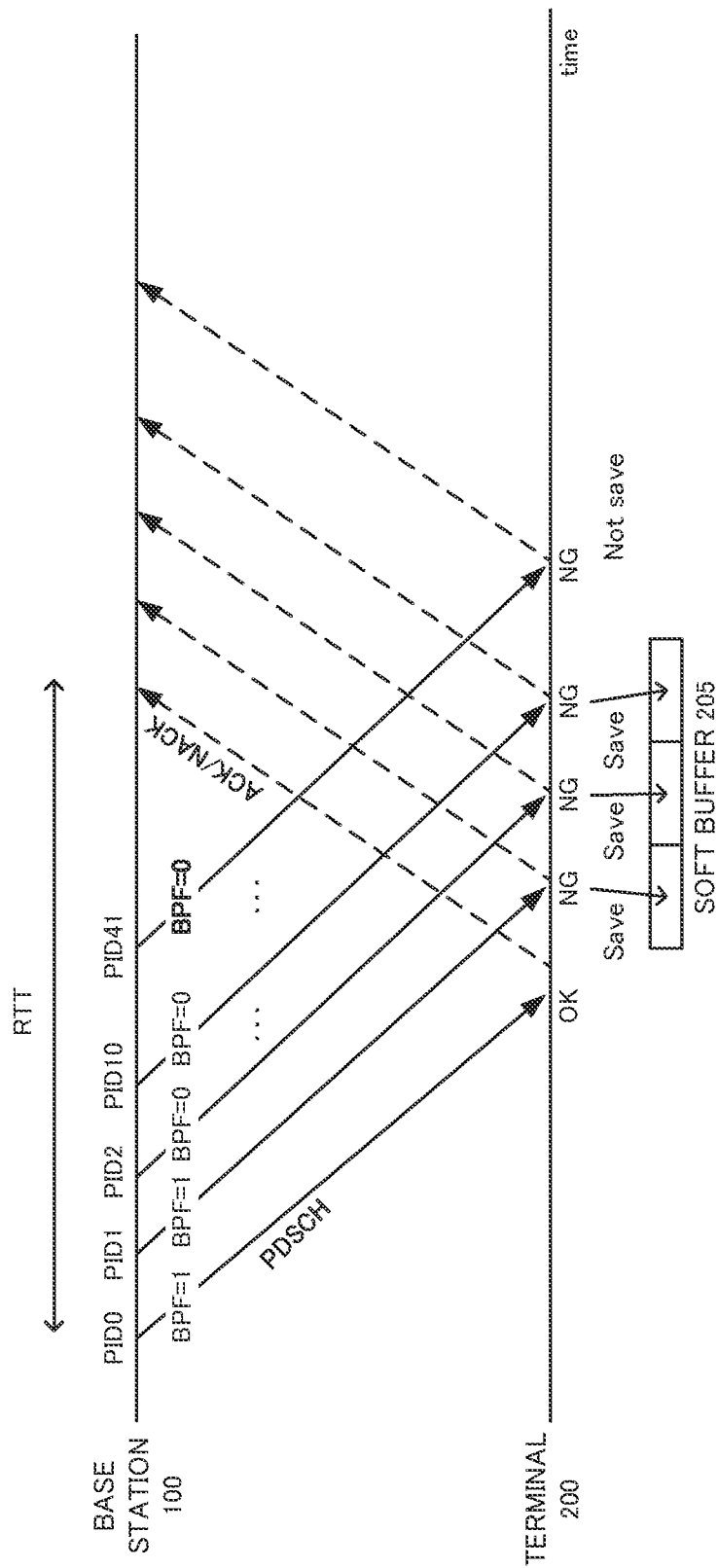
FIG. 7 is a diagram illustrating exemplary operations of the radio communication system according to Embodiment 1.

FIGS. 6 and 7 illustrate examples of the save operation in soft buffer 205.

In the examples illustrated in FIGS. 6 and 7, soft buffer 205 has a buffer corresponding to three processes. In other words, as illustrated in FIGS. 6 and 7, it is assumed that the number of processes corresponding data that can be saved in soft buffer 205 is less than the number of processes corresponding to an RTT Note that the buffer size of soft buffer 205 is not limited to the buffer size corresponding to three processes, but may be any other size.

As illustrated in FIGS. 6 and 7, the decoding result for the data (e.g., PDSCH) with process ID=1 (PID1) is an error (e.g., CRC NG). Therefore, terminal 200 saves the received data with PID1 in soft buffer 205. At this time, terminal 200 saves the process ID (in other words, label) corresponding to the received data together with the received data in soft buffer 205. Further, as illustrated in FIGS. 6 and 7, since BPF=1 is indicated with respect to the data with PID=1, terminal 200 sets (in other words, labels) "higher priority" to the saved data with PID=1, for example.

As illustrated in FIGS. 6 and 7, the decoding results for the data with process ID=2 (PID2) and the data with process ID=10 (PID10) are errors (e.g., CRC NG). Therefore, terminal 200 saves the received data with PID2 and the received data with PID10 in soft buffer 205. Further, as illustrated in FIGS. 6 and 7. BPF=0 is indicated for each of the data with PID=2 and the data with PID=10. Therefore, terminal 200 sets (in other words, labels) "lower priority" to each of the saved data with PID=2 and the saved data with PID=10.

As illustrated in FIGS. 6 and 7, at the time when the received data with PID10 is saved, soft buffer 205 is all in a used state (in other words, a state where there is no free space).

FIG. 6 illustrates exemplary operations in a case where the BPF of the data with PID=41 transmitted from base station 100 to terminal 200 is 1 (the priority is higher) after the received data with PID10 is saved.

As illustrated in FIG. 6, the decoding result for the data with PID41 and BPF=1 is an error (e.g., CRC NG). In this case, terminal 200 discards any data of the lower-priority data (data with BPF=0 or data labeled with the lower priority label) among the data saved in soft buffer 205, and saves the data with PID41 in soft buffer 205. For example, terminal 200 may overwrite the data with the older process ID (data with PID2 in FIG. 6) among the lower-priority data saved in soft buffer 205 with the high-priority data (data with PID41 in FIG. 6), and save the high-priority data.

On the other hand, FIG. 7 illustrates exemplary operations in a case where the BPF of the data with ND=41 transmitted from base station 100 to terminal 200 is 0 (the priority is lower) after the received data with PID10 is saved.

As illustrated in FIG. 7, the decoding result for the data with PID41 and BPF=0 is an error (e.g., CRC NG). In this case, there is no data having a lower priority than the data with PID41 among the data saved in soft buffer 205. Therefore, terminal 200 discards the data with PID41 without saving it. In other words, terminal 200 does not discard the data saved in soft buffer 205.

The examples of the data save operation in soft buffer 205 have been described above.

As described above, although the number of processes in an RTT is increased in an NTN environment as compared with a terrestrial network environment, the number of multipaths is less and a severe propagation path variation is unlikely to occur, so that a lower error rate is easily realized. Therefore, terminal 200 can use, for example, soft buffer 205 having a size smaller than the soft buffer size corresponding to the number of processes corresponding to the RTT. Thus, even when the number of processes in the RTT is increased as in the NTN environment, the size of soft buffer 205 included in terminal 200 can be suppressed. Therefore, according to the present embodiment, for example, the chip size or cost of terminal 200 can be decreased.

Further, in the present embodiment, a priority (e.g., BPF) for buffering in soft buffer 205 (in other words, HARQ combining, is configured for transmission data. In other words, information (e.g., BPF) on buffering for retransmission control is indicated from base station 100 to terminal 200.

As a result, terminal 200 can preferentially buffer higher-priority data in soft buffer 205 and perform HARQ combining even when there is no free space in soft buffer 205. Therefore, according to the present embodiment, since an HARQ combining gain is preferentially obtained with respect to higher-priority data, it is possible to improve the reception success probability of the higher-priority data and to improve the user experience.

Thus, according to the present embodiment, base station 100 and terminal 200 can appropriately perform retransmission control in accordance with a priority of buffering for each of data of different processes. Therefore, for example, even when a size of soft buffer 205 is smaller than the number of processes corresponding to an RTT length, base station 100 can continuously perform data transmission without decreasing the number of processes in the RTT. Thus, according to the present embodiment, it is possible to suppress a decrease in the throughput per user (e.g., maximum user throughput).

Therefore, according to the present embodiment, it is possible to realize appropriate retransmission control processing in accordance with a radio propagation environment.

Note that the data (e.g., data with PID2 of FIG. 6) that is overwritten with other data in soft buffer 205 and the data (e.g., data with PID41 of FIG. 7) that is not saved in soft buffer 205 are discarded by terminal 200. In other words, HARQ combining is not applied to these data. In this case, normal retransmission (ARQ) may be applied to these data. In ARQ, for example, retransmission based on an ACK/NACK signal is performed, and combining of signals is not performed at the receiving side (e.g., terminal 200). Alternatively, for example, retransmission of a higher layer e.g., the RLC layer) may be applied to these data. As described above, the retransmission of the higher layer involves a larger delay as compared with HARQ. For example, in a case where a lower priority (e.g., BPF=0) is configured for data for which a low delay is not required, degradation of the user experience can be suppressed, for example, even when the normal retransmission or the retransmission of the higher layer in which combining is not presupposed instead of HARQ is applied to the data.

[Variation of Embodiment 1]

In Embodiment 1, the BPF indicating the priority of save in soft buffer 205 regardless whether new transmission or retransmission has been described.

On the other hand, in the variation of Embodiment 1, a case where a value of an NDI, that is, the content (or meaning) indicated by the BPF differs depending on new transmission and retransmission will be described.

For example, at the time of new transmission, that is, when the NDI value is toggled (for example, when the value is different from the previous value for the same process), the meaning indicated by the BPF and the operations of terminal 200 are similar to those in Embodiment 1.

On the other hand, at the time of retransmission, that is, when the NDI value is not toggled (for example, when the value is the same as the previous value for the same process), the BPF indicates a decoding method of the corresponding data.

In other words, the BPF includes information indicating a priority of buffering of new data in soft buffer 205 and information indicating whether or not to perform combining processing on retransmission data, for example.

For example, in a case of BPF=0 at the time of data retransmission, terminal 200 performs error correction decoding without performing soft combining. On the other hand, in a case of BPF=1 at the time of data retransmission, terminal 200 soft combines data saved in the past and retransmission data, and then performs error correction decoding.

Further, when there is an error (e.g., CRC NG) after error correction decoding, terminal 200 saves the erroneous data as lower-priority data in soft buffer 205 in a case of BPF=0 and saves the erroneous data as higher-priority data in soft buffer 205 in a case of BPF=1.

For example, base station 100 may indicate BPF=0 for retransmission data when lower-priority data transmitted in the past may have been overwritten with higher-priority data in terminal 200. With this indication, base station 100 can instruct terminal 200 to perform decoding without performing combining. In other words, for example, terminal 200 can determine whether or not to perform combining without preforming processing of determining (or confirming) whether or not the data for the retransmission data is saved in soft buffer 205.

Therefore, according to the variation of Embodiment 1, it is possible to further simplify the processing of terminal 200.

Embodiment 2

In the present embodiment, operations of the radio communication system in the operation of reusing the same process ID for different data transmission in an RTT will be described.

Note that since a base station and a terminal according to the present embodiment have the same basic configuration as base station 100 and terminal 200 according to Embodiment 1, respectively, they will be described with reference to FIGS. 4 and 5.

The number of indication bits for process IDs can be decreased by reusing the process ID. Fax example, when an RTT is 512 ms and a TTI length is 1 ins, there are 512 processes in the RTT, and the number of bits for indication of process IDs is 9. In the present embodiment, for example, by configuring (in other words, limiting) the number of process IDs to be indicated to 64, the number of indication bits for the process IDs can be decreased to 6.

However, since the same process ID is reused for different data in the RTT, a receiving side (for example, terminal 200) may combine received data with different data (in other words, data whose process ID is the same as a process ID of the received data) saved in soft buffer 205.

In the present embodiment, a method of avoiding combining of different data having the same process ID by indicating information on use of the soft buffer with a BPF indicated from base station 100 to terminal 200 will be described. In other words, the present embodiment differs from Embodiment 1 in the content indicated by the BPF.

For example, base station 100 (e.g., controller 101) uses the process IDs in order for data transmission to terminal 200 (see, for example, FIG. 5) in the RTT, and uses (reuses) the used process ID(s) when all the process IDs are used. As a result, the same process ID may be allocated to different data.

When allocating the used process ID to the data, base station 100 (e.g., controller 101) configures BPF=1 for higher-priority data and configures BPF=0 for lower-priority data.

Note that when allocating the unused process ID to the data, base station 100 may, for example, configure BPF=1 for higher-priority data and configure BPF=0 for low-priority data in the same manner as in Embodiment 1.

At the time of retransmission, base station 100 configures BPF=0 when higher-priority different data has been transmitted using the same process ID and configures BPF=1 when higher-priority different data is not transmitted using the same process ID.

Base station 100 transmits data (e.g., new data or retransmission data) and a BPF for the data to terminal 200.

When the new data is received (in other words, an NDI value is toggled), terminal 200 performs error correction decoding. When the decoding result of the new data is an error (e.g., CRC NG), in a case of BPF=1, terminal 200 discards saved data having the same process ID as a process ID of the received data among the data saved in soft buffer 205, and saves the received data in soil buffer 205. When there is no saved data having the same process ID as the process ID of the received data in soft buffer 205, terminal 200 saves the received data in soft buffer 205.

In a case of BPF=0, when the decoding result of the new data is an error, there is no saved data having the same process ID as a process ID of the received data in soft buffer 205, and there is a free space in soft buffer 205, terminal 200 saves the received data in soft buffer 205. On the other hand, when there is saved data having the same process ID as the process ID of the received data with BPF=0 in soft buffer 205 or there is no free space in soft buffer 205, terminal 200 discards the received data without saving it.

Thus, in the present embodiment, the BPF indicates the priority of the buffering in soft buffer 205 between different data associated with the same process ID related to an HARQ process (in other words, retransmission control process).

Figure 8:
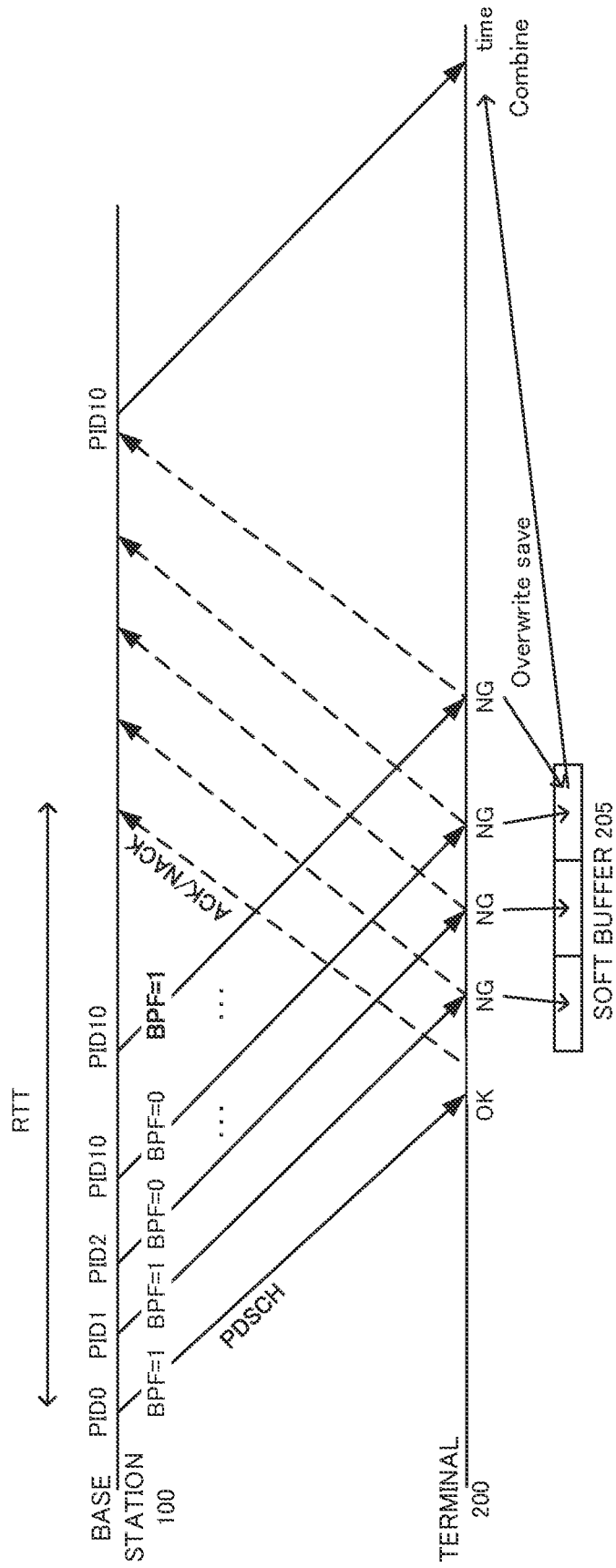
FIG. 8 is a diagram illustrating exemplary operations of the radio communication system according to Embodiment 2.
Figure 9:
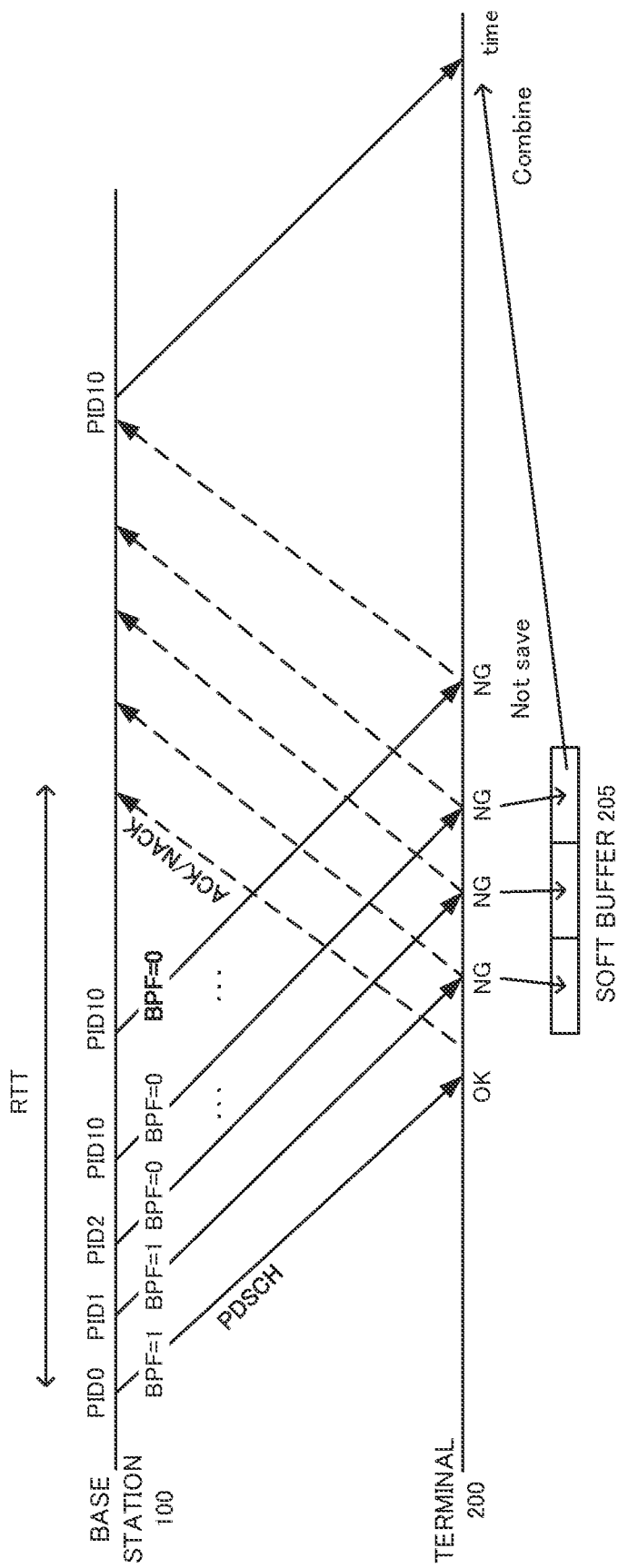
FIG. 9 is a diagram illustrating exemplary operations of the radio communication system according to Embodiment 2.

FIGS. 8 and 9 illustrate examples of the save operation in soft buffer 205 according to the present embodiment.

In the examples illustrated in FIGS. 8 and 9, soft buffer 205 has a buffer corresponding to three processes. In other words, as illustrated in FIGS. 8 and 9, it is assumed that the number of processes corresponding data that can be saved in soft buffer 205 is less than the number of processes corresponding to are RTT Note that the buffer size of soft buffer 205 is not limited to the buffer size corresponding to three processes, but may be any other size.

In FIGS. 8 and 9, as an example, the same process ID=10 (PID10) is reused for different data in the RTT. For example, in FIGS. 8 and 9, the decoding result of the first data with PID10 in terminal 200 is an error (e.g., CRC NG), and the data is saved in soft buffer 205. In FIGS. 8 and 9. BPF=0 is indicated to terminal 200 when the first data with PID10 is transmitted.

In FIG. 8, BPF=1 (priority: high) is indicated to terminal 200 when the second data with PID10 is transmitted, and in FIG. 9, BPF 0 (priority: low) is indicated to terminal 200 when the second data with PID10 is transmitted.

For example, as illustrated in FIG. 8, for BPF'=1 for the second data with PID10, terminal 200 discards the first data with PID10 saved in soft buffer 205 and saves (overwrites save) the second data with PID10. In other words, the second data with PID10 and BPF=1 is saved in soft buffer 205 (in other words, HARQ combined) preferentially over the first data with PID10 and BPF=0.

On the other hand, for example, as illustrated in FIG. 9, for BPF=0 for the second data with PID10, terminal 200 discards the second data with PID10 without discarding the first data with PID10 saved in soft buffer 205.

When the retransmission data is received (in other words, the NDI is not toggled), and with respect to the retransmission data with BPF=1, data having the same process ID as a process ID of the retransmission data is saved in soft buffer 205, terminal 200 combines the saved data and the retransmission data, and error correction decodes the combined data. On the other hand, when with respect to the retransmission data with BPF=1, data having the same process ID as the process ID of the retransmission data is not saved in soft buffer 205, terminal 200 error correction decodes the retransmission data without performing combining. Terminal 200 saves the received data in soft buffer 205 when the decoding to result of the retransmission data is an error (e.g., CRC NG).

On the other hand, when the retransmission data is received, with respect to the retransmission data with BPF=0, terminal 200 error correction decodes the retransmission data without performing combining regardless of whether or not data having the same process ID as the process ID of the retransmission data is saved in soft buffer 205. Terminal 200 does not save the received data in soft buffer 205 even when the decoding result is an error (e.g., CRC NG).

The examples of the data save operation in soft buffer 205 have been described above.

As described above, according to the present embodiment, when the data having the same process ID as the process ID of the received data is saved in soft buffer 205, with respect to the received data with BPF=1, terminal 200 discards the past data (in other words, saved data), and newly saves (overwrites save) the received data in soft buffer 205. On the other hand, when the data having the same process ID as the process ID of the received data is saved in soft buffer 205, with respect to the received data with BPF=0, terminal 200 discards the received data and holds the past data (in other words, saved data).

As a result, in the present embodiment, even when the process ID is reused, terminal 200 can preferentially save (in other words, HARQ combine) any of the different data using the same process ID in soft buffers 205. In other words, in the present embodiment, terminal 200 can prevent different data using the same process ID from being combined at the time of retransmission.

Further, according to the present embodiment, it is possible to improve the efficiency of HARQ while decreasing the number of indication bits for the process IDs (in other words, control overhead). Therefore, according to the present embodiment, it is possible to realize appropriate retransmission control processing in accordance with a radio propagation environment.

(Variation 1 of Embodiment 2)

In Variation 1 of Embodiment 2, a case where a period (also called as a segment, for example) in which a process ID is valid is configured will be described.

In Variation 1 of Embodiment 2, different data associated with the same process ID is transmitted in different segments of a plurality of segments. In other words, data having the same process ID in different segments are treated as separate dat.

Figure 10:
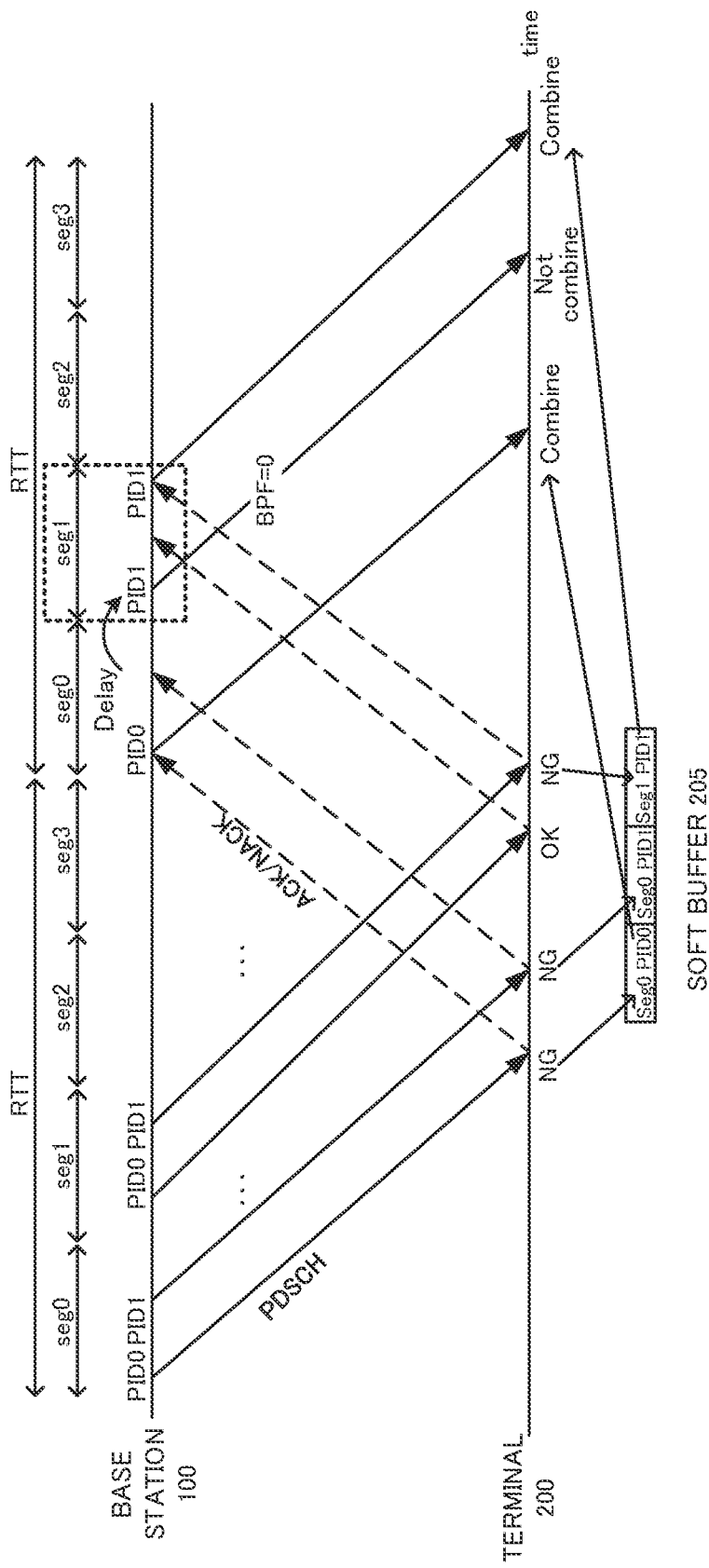
FIG. 10 is a diagram illustrating exemplary operations of the radio communication system according to Variation 1 of Embodiment 2.

FIG. 10 is a diagram illustrating exemplary operations according to Variation 1 of Embodiment 2.

An RTT interval is divided into a plurality of segments (in FIG. 8, four segments of seg0 to seg3). For example, as illustrated in FIG. 10, seg0 to seg3 are repeatedly configured with the RTT as a cycle.

For example, terminal 200 saves data having the same process ID of different segments as different data in soft buffer 205. In other words, terminal 200 saves the received data in soft buffer 205 based on a combination of the segment and the process ID.

For example, when the decoded result of the data with the process ID=0 (PID0) is an error (CRC NG) in seg0 illustrated in FIG. 10, terminal 200 saves the received data with PID0 in seg0 in soft buffer 205, and assumes that retransmission of the data with PID0 is performed during seg0 period of the next RTT interval that is the same segment of the current RTT.

Also, when terminal 200 receives data having the same process ID (e.g., data with PID1 illustrated in FIG. 10) in different segments (e.g., seg0 and seg1 illustrated in FIG. 10), terminal 200 performs reception processing on these data as different data. For example, as illustrated in FIG. 10, when the decoding results of the data with PID1 in seg0 and the data with PID1 in sea1 are CRC NG, terminal 200 separately saves each of these received data (for example, data with PID1 in seg0 and data with PIM in seg1) in soft buffer 205. In other words, terminal 200 manages soft buffer 205 based on the segment and the process ID.

Thus, when indicating the process ID to terminal 200, base station 100 only needs to indicate the process ID in the segment, so that indication bits for the process IDs can be decreased. For example, when an RTT is 512 ms, a TTI length is 1 ms, and four segments each of which has a segment length of 128 ms are configured, the maximum number of processes in the segment is 128. Therefore, for example, for the process IDs corresponding to the RTT length, the number of indication bits is 9, whereas in Variation 1 of Embodiment 2, the number of indication bits for the process IDs is 7. Thus, the number of indication bits can be decreased.

Further, the process ID may be reused in the segment by combining Variation 1 and Embodiment 2. For example, in the above example (when the segment length is 128 ms and the maximum number of processes is 128), 16 process IDs may be indicated, for example. In this case, the number of indication bits for the process IDs is 4. Thus, the number of indication bits can be further decreased. When the process ID in the segment is reused, for example, as described in Embodiment 2, a BPF can be used to avoid combining data differing from each other in terminal 200, thereby enabling HARQ combining of higher-priority data.

Here, it is assumed that data transmitted in a certain segment is retransmitted in the same segment after the RTT has elapsed. However, base station 100 may not be able to perform transmission in the same segment due to other processing with a higher priority or data transmission and reception for another user. In this case, base station 100 may transmit retransmission data together with BPF=0 in the next segment without waiting for the same segment in the next RTT interval for transmission, for example. In this case, since the BPF is 0, terminal 200 performs decoding processing without soft combining the data saved for the segment (seg1) and the received data. Terminal 200 does not save the received data in soft buffer 205 even when the decoding result of the received data is an error. In this manner, when data transmitted in a certain segment of a plurality of segments is retransmitted in a different segment, a BPF for the data retransmitted in the different segment indicates that combining processing (in other words, save in soft buffer 205) is not performed on the data.

For example, in FIG. 10, data with PID1 in seg0 of a certain RTT is originally retransmitted in seg0 after the elapse of the RTT. On the contrary, when transmission of the data with PID1 in seg0 is delayed, base station 100 illustrated in FIG. 10 transmits, in seg1, the data with PID1 in seg0 together with BPF=0, for example. As illustrated in FIG. 10, base station 100 transmits, in seg1, retransmission data for the data with PID1 in seg1 without a BPF. In this manner, in FIG. 10, the different data associated with PID1 are transmitted in seg1.

In this case, as illustrated in FIG. 10, terminal 200 combines the retransmission data with PID1 transmitted without the BPF seg1 and saved data with PID1 seg1 saved in soft buffer 205. On the other hand, as illustrated in FIG. 10, terminal 200 performs reception processing. on the data with PID1 transmitted together with BPF=0 in seal without performing combining (in other words, saving the data).

Thus, even when data are across segments, base station 100 can avoid combining different data and retransmit the data, so that even when data cannot be transmitted in the same segment, a delay can be decreased. For example, it is possible to further prevent generation of a delay equal to or more than 1 RTT.

Note that segment lengths in an RTT may all be the same, or at least a part of the segment lengths may be different (may be shorter or longer).

(Variation 2 of Embodiment 2)

In Variation 2 of Embodiment 2, a case where a process ID and a slot number are associated (in other words, tied or linked) with each other will be described.

In synchronous HARQ, a transmission timing of each process is predetermined. For example, after certain data is transmitted, corresponding retransmission data is transmitted after the RTT has elapsed. As described above, in synchronous HARQ, since the data transmission timing is predetermined, there may be no indication of process IDs. On the other hand, in synchronous HAW), since the transmission timing is determined, flexibility of scheduling (e.g., data allocation to each terminal) is decreased. Further, for example, although indicating the process ID can improve the flexibility of scheduling, an amount of control data for the indication of the process Ms is increased.

Therefore, in Variation 2 of Embodiment 2, a process ID is indicated based on a slot number and a relative value from the slot number (in other words, an offset value to the slot number; also called as a process ID relative value). This cam improve the flexibility of scheduling while decreasing the amount of control data for the indication of the process ID.

For example, let the slot number be "n," let the relative value (offset value) to be indicated be "p," and let the number of processes corresponding to the RTT (in other words, the value obtained by dividing the RTT by the TTI) be "nRIT" In this case, the process ID (PID) is calculated by the following Equation (1):

$$PID=(n+p+nRTT)\bmod nRTT \quad (1)$$

Here, p may be represented by 4 bits, for example, −8, −7, . . . , +7. In this case, base station 100 indicates a 4-bit p to terminal 200. Terminal 200 calculates the process II) intended by base station 100 according to Equation (1), Note that the number of bits for p is not limited to 4, but may be another number.

Figure 11:
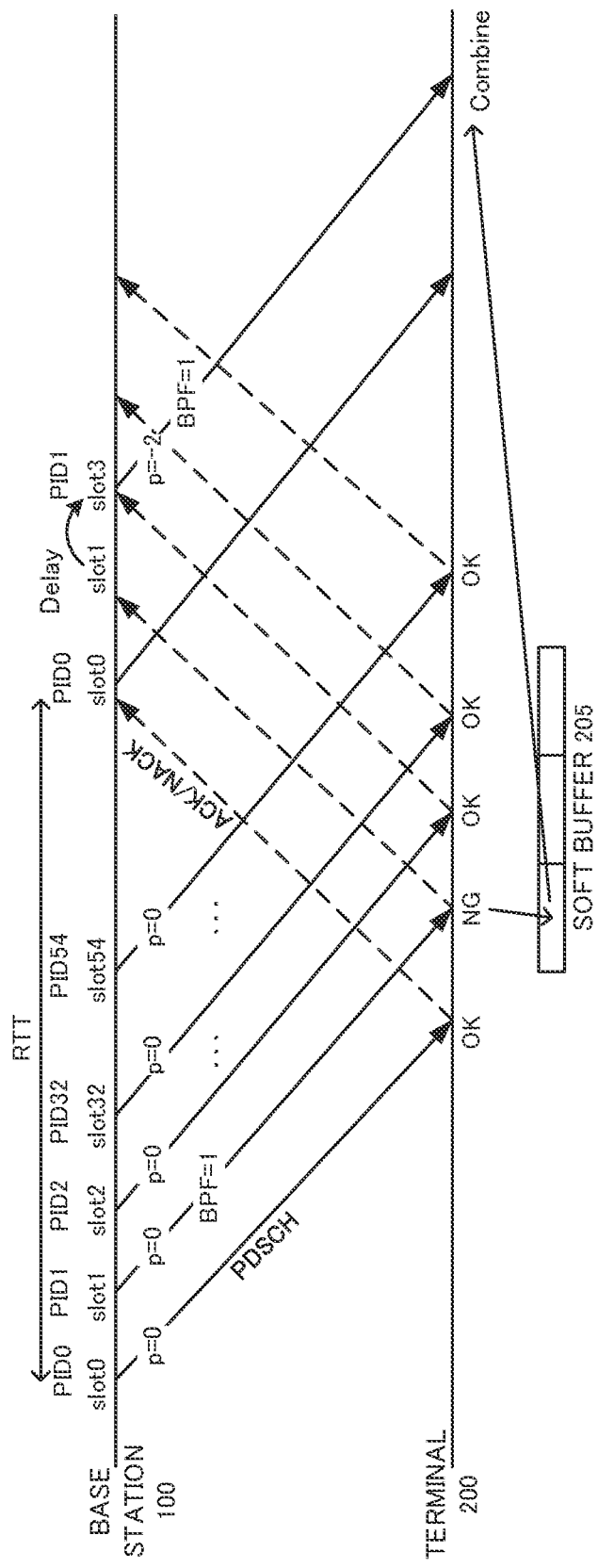
FIG. 11 is a diagram illustrating exemplary operations of the radio communication system according to Variation 2 of Embodiment 2.

FIG. 11 is a diagram illustrating exemplary operations according to Variation 2 of Embodiment 2.

For example, as illustrated in FIG. 11, when data with PID1 and with p=0 configured transmitted in slot1 is retransmitted in slot3 with a timing delayed by two slots from the time when the RTT elapses (in other words, next slot1), base station 100 configures p=−2. Thus, the value of (n+p) in Equation (1) at the time of new transmission (n=1, p=0) is the value of (n+p) at the time of retransmission (n=3, p=−2) is '1.' As a result, the PIDs are the same with each other. As illustrated in FIG. 11, when the data with PID1 is retransmitted in slot3, BPF=1 is configured.

Thus, the value of p (offSet value) may be determined based on a difference between a slot number corresponding to the time of new transmission of data and a slot number corresponding to the time of retransmission of the data. A BPF for the retransmission data indicates that combining processing is performed. Thus, base station 100 can indicate, to terminal 200, the same process ID (e.g., PID1) at a timing different from the predetermined transmission timing.

In transmitting higher-priority data, base station 100 may configure a process ID to which lower-propriety data saved in soft buffer 205 is allocated to a process ID of the higher-priority data and configure BPF=1 in order to overwrite the lower-priority data.

Figure 12:
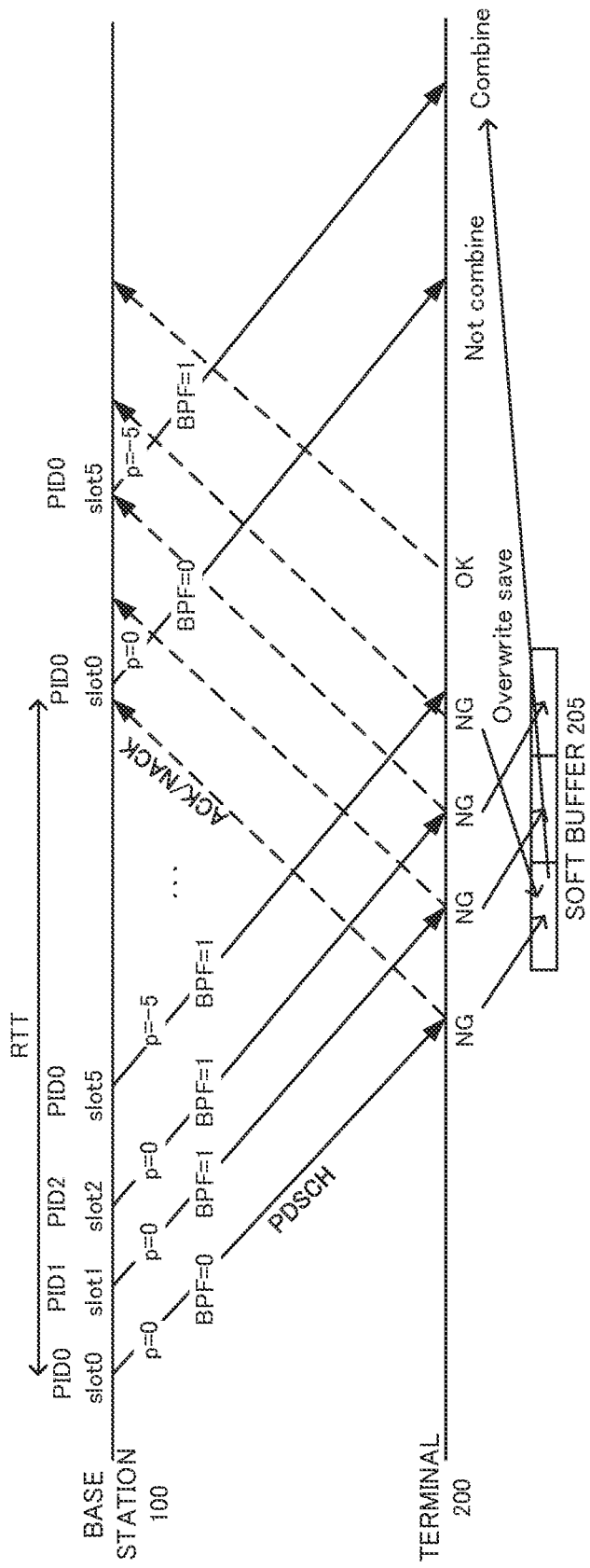
FIG. 12 is a diagram illustrating exemplary operations of the radio communication system according to Variation 2 of Embodiment 2.

For example, as illustrated in FIG. 12, base station 100 configures p=0 and BPF=0 in slot0, and transmits data with PID0. Also, as illustrated in FIG. 12, base station 100 configures p=−5 and BPF=1 in slot5 (n=5) in the same RTT, and transmits data with PID0. In other words, in slot5 illustrated in FIG. 12, the same process ID as the process ID of the data transmitted by configuring p=0 and BPF:=0 is indicated to terminal 200, In this case, with respect to indicated PID0, terminal 200 discards data (in other words, data with BPF=0) saved in soft buffer 205, and saves the newly received data (in other words, data with BPF=1).

Thus, the value of p (offset value) is determined based on a difference between a slot number (slot0 in FIG. 12) corresponding to transmission of first data saved in soft buffer 205 of terminal 200 and a slot number corresponding to transmission of second data corresponding to the same PID as a PID (PID0 in FIG. 12) associated with the first data (slot5 in FIG. 12). A BPF for the second data indicates that buffering of the second data in soft buffer 205 is performed.

As described above, according to Variation 2 of Embodiment 2, it is possible to improve the flexibility of scheduling while decreasing the number of indication bits for the process IDs. Further, in Variation 2 of Embodiment 2, by combining the indication of the relative value p and the indication of the BPF, soft buffer 205 is preferentially used for the higher-priority data over the lower-priority data, so that the reliability of the higher-priority data can be improved and the delay can be shortened.

Note that the slot number is a number of a slot configured by base station 100 or the system, and may be a number repeated for each system frame. In this case, the value of n in Equation (1) may be calculated by the following Equation (2):

$$n=\text{Slot number}+\text{System frame number}*(\text{Number of slots per system frame}) \quad (2)$$

The slot number may be a number repeated fir each subframe. In this case, the value of n in Equation (1) may be calculated by the following Equation (3):

$$n=\text{Slot number}+\text{System frame number}*\text{Subframe number}*(\text{Number of slots per subframe}) \quad (3)$$

Note that although the slot has been described in Variation 2 of Embodiment 2, the time resource unit is not limited to the slot, but may be another time resource unit (e.g., frame, subframe, mini slot or the like).

Embodiment 3

In the present embodiment, a case where the terminal collectively indicates (feeds back) ACK/NACK signals for a plurality of transmission data (e.g., transport blocks) to the base station will be described.

For example, a periodicity of the indication of the ACK/NACK signals may be indicated from the base station to the terminal in advance. At an indication timing of ACK/NACK signals, for example, the terminal collectively transmits ACK/NACK signals for data received after the previous indication timing.

Figure 13:
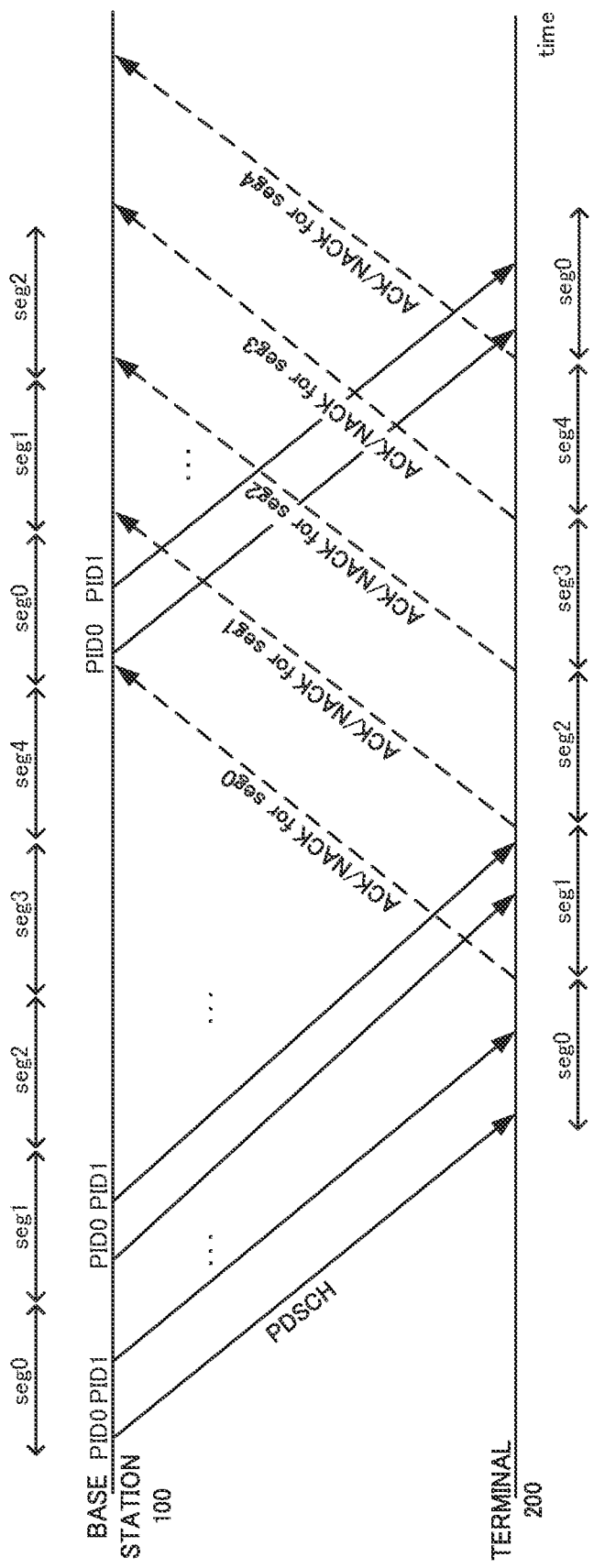
FIG. 13 is a diagram illustrating exemplary operations of the radio communication system according to Embodiment 3.

FIG. 13 illustrates exemplary operations of the radio communication system according to the present embodiment.

In FIG. 13, as an example, a fixed period (e.g., RTT) is divided into a plurality of segments (e.g., five segments in this example) (seg0 to seg4), and ACK/NACK signals are indicated once for each segment. For example, the terminal may hold ACK/NACK signals generated in a segment and performs transmission processing on the ACK/NACK signals at a timing of the break of the segment (in other words, border).

Further, terminal 200 may change an indication method for ACK/NACK signals based on, for example, a traffic condition, a channel condition, or an ACK/NACK For example, indication methods for ACK/NACK signals include the following.

<Indication Method 1>

As described above, in an NTN, a lower error rate (e.g., BLER) can be realized because a propagation path variation is smaller than that in a terrestrial network.

Therefore, in indication method 1, the terminal indicates a process ID of data whose ACK/NACK signal is a NACK (in other words, process ID of data whose decoding result is an error) among data received in a fixed period (e.g., segment). In other words, in indication method 1, the terminal does not indicate a process ID of data whose ACK/NACK signal is an ACK, among the data received in the fixed period.

For example, a case where ACK/NACK signals are collectively transmitted every 64 ms in indication method 1 will be described. Here, let the number of processes corresponding to NACKs (in other words, the number of data having an error in the decoding result) be "nError." In this case, the terminal indicates information of nError×6 (=log 2(64))+6 bits by considering indication of the number of errors and indication of the process ID(s) of the data having an error. For example, for the number of processes of data having an error "nError"=1, the number of indication bits is 12, which is less than 64 (bits).

<Indication Method 2>

In indication method 2, a bitmap represents one ACK/NACK signal for each process's data. For example, when collectively transmitting ACK/NACK signals every 64 ms, the terminal indicates information of up to 64 bits.

The indication methods for ACK/NACK signals have been described above.

Here, for example, when ACK/NACK signals are collectively transmitted every 64 ms and the number of processes of data having an error is 10 or more (nError>=10), the number of indication bits is 66 or more in indication method 1. Therefore, the number of indication bits in indication method 2 (e.g., 64) is smaller than that in indication method 1. In other words, when ACK/NACKs are collectively transmitted every 64 ms and the number of processes of data having an error is less than 10 (nError<10), the number of indication bits is less than 64 (that is, the number of indication bits in indication method 2) in indication method 1.

Therefore, in the present embodiment, the terminal switches between indication method 1 (in other words, ACK/NACK indication by a process ID corresponding to a NACK) and indication method 2 (in other words, ACK/NACK indication by a bitmap) depending on a situation.

Hereinafter, ACK/NACK indication switching methods 1 and 2 will be described.

<Switching Method 1>

In switching method 1, the base station configures an indication method for ACK/NACK signals for each terminal.

For example, an indication method for ACK/NACK signals is indicated from the base station to the terminal. For example, the base station may configure a configuration of an ACK/NACK indication method for each terminal, and indicate the configuration by a higher layer RRC reconfiguration message), or may configure a configuration of an ACK/NACK indication method for each cell, and indicate the configuration by system information. The terminal switches between indication method 1 and indication method 2 based on the indication from the base station.

For example, the base station may switch between indication method 1 and indication method 2 based on an occurrence frequency of data communication or a condition of a propagation path variation. For example, the base station may configure indication method 1 when the occurrence frequency of the data notification is low (for example, when the occurrence frequency is less than a threshold), and may configure indication method 2 when the occurrence frequency of the data notification is high (for example, when the occurrence frequency is equal to or greater than the threshold).

Alternatively, for example, the base station may configure indication method 1, when the propagation path variation is small (for example, when the propagation path variation is less than a threshold), and may configure indication method 2 when the propagation path variation is large (for example, when the propagation path variation is equal to or greater than the threshold).

Note that the switching criterion for the ACK/NACK indication methods is not limited to the occurrence frequency of the data notification and the condition of the propagation path variation, but may be another criterion. In other words, the criterion may be such that indication method 1 is configured in a situation where the number of indication bits for ACK/NACK signals tends to be smaller in indication method 1 than that in indication method 2, and indication method 2 is configured in a situation where the number of indication bits for ACK/NACK signals tends to be smaller in indication method 2 than that in indication method 1.

<Switching Method 2>

In switching method 2, the terminal selects an ACK/NACK indication method.

For example, the terminal may select one of indication method 1 and indication method 2 in which the number of indication bits is smaller.

Here, let the number of processes to be reported be "nP" and let the number of NACKs be "nN." In this case, the number of indication bits for indication method 1 and the number of indication bits for indication method 2 are as follows:

The number of indication bits for indication method 1: nP (bits)

The number of indication hits for indication method 2: nN*ceil (log 2(nP))+ceil (log 2(nP)) (bits) (including indication bits for the number of NACKs)

Note that ceil indicates an operation for rounding up the decimal point.

The terminal selects one of indication method 1 and indication method 2 in which the number of indication bits is smaller, and indicates the selected indication method to the base station. The base station receives ACK/NACK signals, for example, based on the indication method for ACK/NACK signals indicated from the terminal.

Figure 14:
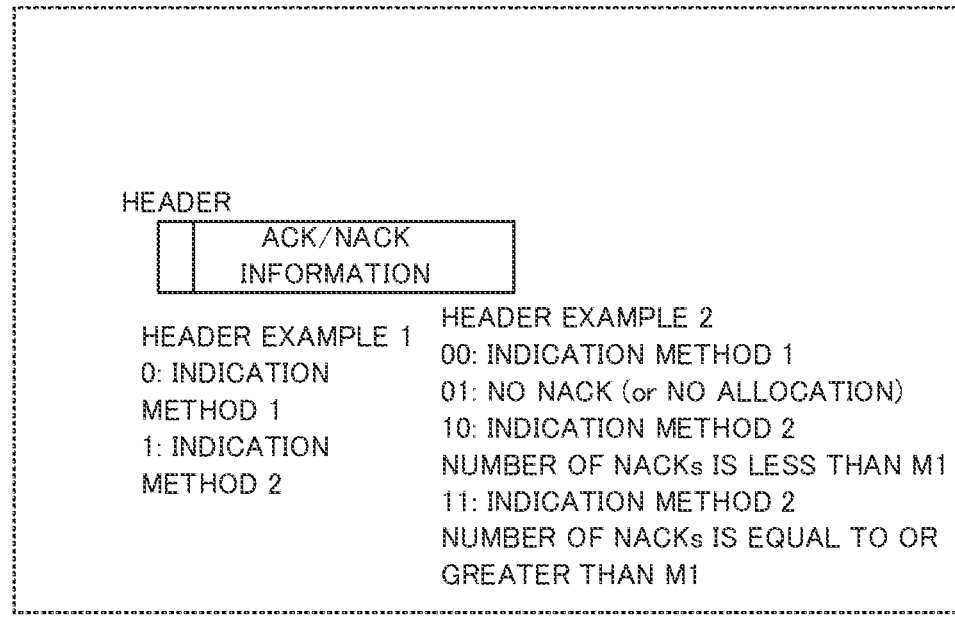
FIG. 14 is a diagram illustrating an example of indication information of ACK/NACK according to Embodiment 3.

FIG. 14 illustrates examples of formats for indicating ACK/NACK signals. In FIG. 14, information indicating an indication method is stored in a header, and ACK/NACK signals are stored in the remaining portion (for example, ACK/NACK information field).

In the header example 1 of FIG. 14, the number of bits of the header is 1, and indication method 1 or indication method 2 is specified by the 1-bit header (one of 0 and 1). Note that in indication method 2, the number of indication bits for ACK/NACK signals differs depending on the number of NACKs. Therefore, the base station may determine the number of indication bits (length) for ACK/NACK signals based on indication bits for NACKs in the ACK/NACK information field illustrated in FIG. 14, for example.

In the header example 2 of FIG. 14, the number of bits for the header is 2, and the absence of NACK (or no data allocation) is specified in addition to indication method 1 and indication method 2 by the 2-bit header (one of 00, 01, 10 and 11).

In the header example 2, in a case of the absence of NACK (header: 01), for example, the subsequent ACK/NACK information field does not contain information. Further, in the header example 2, in a case of indication method 2, the header may specify whether the number of NACKs is less than M1 (header: 10) or equal to or greater than M1 and less than M2 (header: 11), When the number of NACKs is less than M1, ACK/NACK signals having ceil (log 2(M1)) bits are stored, and when the number of NACKs is equal to or greater than M1 and less than M2, ACK/NACK signals having ceil (log 2(M2)) bits are stored. Thus, the base station can determine the number of bits in the ACK/NACK information field by reading the header.

Further, in the header example 2, a type of the number of bits of the ACK/NACK information field (for example, four types of the number of bits in FIG. 14) may be defined. Thus, for example, the terminal selects one of radio resource (for example, time and frequency resource) candidates whose number (four in FIG. 14) is determined in accordance with the type of the number of bits, and transmits the ACK/NACK information. The base station blind detects one of radio resources whose number is determined in accordance with the type of the number of bits. In this case, error correction coding can be performed using the header and the ACK/NACK information field as the same block, resulting in a higher coding gain.

As described above, in the present embodiment, by collectively indicating ACK/NACK signals for a plurality of received data to the base station, the terminal can indicate the ACK/NACK signals with one of the indication methods in which the number of indication bits is smaller, thereby decreasing the overhead of ACK/NACK indication.

Further, for example, when an ACK/NACK signal of one bit (for example, one process) is transmitted each time, radio resource usage such as spreading or a plurality of repeated transmissions may be increased in order to receive the signal at an error rate (sufficiently low error rate) required in the base station. On the contrary, in the present embodiment, since ACK/NACK signals are collectively fed back, an error correction coding gain or diversity gain is obtained, thereby improving the efficiency of use of radio resources.

Furthermore, when radio resources for indication of ACK/NACK signals are used, a more robust transmission method (e.g., transmission at a lower coding rate) can be realized by decreasing the number of indication bits, thereby improving the reliability of ACK/NACK indication. For example, in an NTN, since long-distance transmission is performed, it is to important to improve the reliability.

Note that although in the present embodiment, as the example, the case where the indication timing of the ACK/NACK signals is separated for each segment has been described, the present disclosure is not limited thereto. For example, the base station may indicate a feedback periodicity for ACK/NACK signals, and the terminal may indicate ACK/NACK signals based on the feedback periodicity.

Embodiment 3 may be combined with, for example, at least one of Embodiment 1 and Embodiment 2.

For example, by combining Embodiment 1 and Embodiment 3, terminal 200 (see, for example, FIG. 5) can appropriately perform HARQ of higher-priority data by controlling data save in soft buffer 205 (in other words. HARQ combining) based on a BPF (in other words, priority) indicated from base station 100 (see, for example, FIG. 4). Further, terminal 200 can decrease the number of indication bits by collectively feeding back ACK/NACK signals to base station 100, as in Embodiment 3.

Similarly, for example, by combining Embodiment 2 and Embodiment 3, terminal 200 can appropriately perform HARQ of higher-priority data based on a BPF indicated from base station 100 (see, for example, FIG. 4) without combining data having the same process ID even when a process ID is reused in an RTT Further, terminal 200 can decrease the number of indication bits by collectively feeding back ACK/NACK signals to base station 100, as in Embodiment 3.

(Variation 1 of Embodiment 3)

In Embodiment 3, the case where the terminal collectively indicates the ACK/NACK signals in each segment to the base station has been described. In Variation 1 of Embodiment 3, the terminal may also collectively transmit ACK/NACK signals for each section (called as "subsegment," for example) obtained by dividing a segment.

For example, a segment may be further divided into four subsegments, and the base station and the terminal may configure or select an ACK/NACK indication method for each subsegment. In this case, for example, as illustrated in FIG. 15, a header may be added for each subsegment. Thus, for example, a different indication method can be configured for each subsegment.

Further, for example, in an environment in which errors occur in a concentrated manner, indication method 1 may be configured in a period of a subsegment in which errors are concentrated, and indication method 2 may be configured in a period of another subsegment. Thus, since one of the indication methods in which the number of indication bits is smaller is selected for each period finer than a segment, the number of ACK/NACK indication bits can be further decreased.

The embodiments of the present disclosure have been described above.

Note that in Embodiments 1 and 2, terminal 200 may indicate, to base station 100, information indicating whether or not terminal 200 has saved (or stored) data in soft buffer 205 together with an ACK/NACK signal. Or, terminal 200 may indicate DTX (that is, no ACK or NACK) to base station 100 when terminal 200 does not save data in soft buffer 205. Base station 100 may determine transmission parameters at the time of retransmission based on the indicated information. For example, for data not saved in soft buffer 205 at terminal 200, base station 100 may transmit the same RV again so that it can be received in the same way as the previous transmission at terminal 200 or may transmit an RV including Systematic Bits (in other words, the original information bits). Further, for example, for data saved in soft buffer 205 at terminal 200, base station 100 may transmit a different RV or may transmit an RV that does not include Systematic Bits or has a lower rate of Systematic Bits. When terminal 200 does not save data in soft buffer 205, terminal 200 may indicate information indicating that the data is not saved to decrease an amount of indication information.

In Embodiments 1 and 2, a BPF may be explicitly indicated in allocation information included in DCI or a PDCCH, or may be implicitly indicated by another parameter. For the implicit indication, for example, a BPF may be indicated by a DCI format used for terminal 200, RNTI (Radio Network Temporary ID) used for scrambling a PDCCH, or time and frequency resources called as a search space and CORESET over which a PDCCH was transmitted. Or, terminal 200 may determine BPF=1 when an RV for new transmission including Systematic Bits is indicated for retransmission data and decode the retransmission data without combining the retransmission data, and determine BPF=0 when an RV for retransmission not including Systematic Bits or having a lower rate of Systematic Bits is indicated, combine the retransmission data and perform decoding. Further, terminal 200 may determine BPF=1 when an MCS for new transmission is indicated and decode retransmission data without combining the retransmission data, and determine BPF=0 when an MCS for retransmission is indicated and perform decoding without combining retransmission data.

A BPF may also be indicated by a process ID specially defined in a process ID When a particular process ID is indicated, terminal 200 determines BPF=0, and transmits a NACK without saving received data even when there is an error in the received data. When determining BPF=0, for retransmission data, terminal 200 decodes the retransmission data without performing combining. When a process ID other than the particular process ID is indicated, terminal 200 determines BPF=1, saves received data when there is an error in the received data, and transmits a NACK. When determining BPF=1, for retransmission data, terminal 200 combines the retransmission data and perform combining. The particular process ID may be predetermined, or may be indicated from base station 100 to terminal 200 by system information or the like.

A BPF may also be indicated by a Logical Channel ID. For example, a higher-priority Logical Channel ID may mean BPF=1 (priority: high) and a lower-priority Logical Channel ID may mean BPF=0 (priority: low). Note that a priority for each Logical Channel ID may be predetermined, or may be indicated from base station 100 to terminal 200. For example, base station 100 can indicate a Logical Channel ID by DCI each time data is transmitted, so that terminal 200 can identify the Logical Channel ID (in other words, BPF) prior to data decoding.

Further, in each embodiment or variation, there is a possibility that there is a method that the terminal can cope with and a method that the terminal cannot cope with, depending on the capability of the terminal (UE). In such a case, each terminal may select a method to be applied according to the terminal capability (UE capability).

Although in Embodiments 1 and 2, the case where the BPF is 1 bit has been described, the number of bits for the BPF may be 2 or more. For example, when the number of bits for the BPF is 2, four levels of priority may be indicated as follows. In this example, among BPF=00, 01, 10, and 11, 00 has the highest priority and 11 has the lowest priority.

00: Always save data in soft buffer 205 and prohibit overwriting with other data.

01: Always save data in soft buffer 205 and allow overwriting with other data 10: Save data in soft buffer 205 when there is a free space and allow overwriting with other data 11: Not save data in soft buffer 205 even when there is a free space Further, in Embodiments 1 and 2, when BPF=1 is indicated (in other words, higher-priority data is received), and soft buffer 205 of terminal 200 is used for higher-priority data (in other words, there is no free space or there is no saved lower-priority data), terminal 200 may perform the following operations. For example, terminal 200 may discard the oldest data among data saved in soft buffer 205 and save the current received data. Or, terminal 200 may discard the current received data without saving it and may not indicate an ACK/NACK. In other words, terminal 200 may operate as if there was no data transmission this time. In this case, base station 100 may retransmit the same data as new data (NDI toggle indication) because there is no ACK/NACK indication.

Or, terminal 200 may operate assuming that higher-priority data (in other words, data with BPF=1) more than a buffer amount implemented in soft buffer 205 is not transmitted. In this case, a terminal operation is not defined and may be configured according to the implementation of terminal 200. For example, the operation may be different for each terminal.

The disclosed embodiments are applicable regardless of the type of satellite, such as GEO (Geo-stationary Earth Orbit), MEO (Medium Earth Orbit), LEO (Low Earth Orbit), HAPS, or the like. Further, the embodiments of the present disclosure are not limited to an NTN, but can be applied to, for example, a terrestrial network in an environment where a cell size is large and a propagation delay between a base station and a terminal is long g an environment where the propagation delay is equal to or greater than a threshold).

In the above embodiments, the ACK/NACK signal may be called as HARQ-ACK or HARQ-Feedback information.

Further, even when the terminal for which HARQ-Feedback is configured to be disabled (inactivated) does not transmit an ACK/NACK signal, an error rate can be improved by transmitting data from the base station a plurality of times and HARQ combining the data at the terminal. Even in this case, by indicating a BPF indicating whether or not to combine the data at the terminal, a limited HARQ buffer can be effectively utilized. For example, when the base station transmits data a plurality of times, BPF=1 may be indicated, and the terminal may store the data in the HARQ buffer. On the other hand, when the base station does not transmit any more data, BPF=0 may be indicated, and the terminal may not store the data in the HARQ buffer. Also, the indication of the BPF may be applied only to an HARQ process for which HARQ-Feedback is configured to be disabled. Since indication of HARQ related information such as RV information is not necessary in the HARQ process for which HARQ-Feedback is configured to be disabled, the indication is possible without increasing the data size of control information by indicating the BPF instead of the HARQ related information.

Furthermore, although in each of the above-described embodiments, the downlink data transmission from the base station to the terminal has been described, the present disclosure is applicable not only to this but also to uplink data transmission from the terminal to the base station. In the uplink data, transmission, whether or not data hold in the terminal transmission buffer is needed may be instructed by indicating a BPF' together with uplink data allocation indication from the base station to the terminal. In this case, the BPF is indicated by DCI. Alternatively, the terminal may indicate, to the base station, a BPF together with uplink transmission data, thereby instructing whether or not the data needs to be held in a reception buffer of the base station. In this case, the BPF is indicated by UCI (Uplink Control Information).

In addition, although the above-described embodiments assume Dynamic scheduling in which data is allocated using DCI or a PDCCH for each data transmission as data allocation in uplink and downlink to the terminal, the present disclosure is also applicable to a case where downlink semi-persistent scheduling (SPS) or uplink Configured grant (CG) that periodically allocates radio resources to the terminal in advance is used. In this case, as in Rel. 15 NR, the initial transmission data is transmitted in radio resources allocated periodically in advance, but at the time of HARQ retransmission, Dynamic scheduling of allocating data using DCI or a PDCCH may be used. A BPF may be indicated when allocation of periodic radio resources (periodicity) is indicated from the base station to the terminal, or may be indicated by DCI or a PDCCH at the time of HARQ retransmission. RRC reconfiguration, MAC CE or DCI can be used for the indication of the allocation of the periodic radio resources (periodicity). Further, in Embodiment 2, in a case where a HAW) process is determined based on a transmission timing, with respect to SPS or CG for which the same HARQ process ID is configured, the HARQ process may be determined based on a transmission timing (for example, slot number or segment) of the initial transmission data transmitted using SPS or CG resources.

Also, in Rel. 15 NR, when uplink CG is used, configuredGrantTimer operates after the initial transmission data is transmitted, and during the time period until the timer expires (for example, duration of the timer), the new initial transmission data transmission from the terminal using CG resources is prohibited, and only allocation of retransmission data by dynamic scheduling is performed. On the other hand, since an RTT is long in an NTN, a delay is increased while waiting for a retransmission instruction from the base station. For this reason, configuredGrantTimer may be set to a value equal to or less than the RTT data transmitted from the terminal using CO resources within the duration of configuredGrantTimer may be treated as retransmission data, and received data may be combined. Thus, the terminal can retransmit data transmission that needs to be improved in reliability without waiting for an instruction to allocate the retransmission data by dynamic scheduling from the base station. On the other hand, configuredGrantTimer may be disabled in a case where high reliability is not required. In this case, disablement of HARQ feedback or disablement of configuredGrantTimer may be indicated by a ConfiguredGrantConfig message for configuring CG.

Although in the above embodiments, the communication between the single base station and the single terminal has been described, the present disclosure is not limited thereto. For example, one base station may perform the operations of each embodiment with respect to each of a plurality of terminals. One terminal may perform the operations of each embodiment with respect to a plurality of base stations.

Further, among Embodiments 1, 2 and 3 described above and the variations of the respective embodiments, at least two or more methods may be combined and operated.

In addition, the values of the RTT length, the buffer size, the number of processes, the number of process Ms, the number of segments, the BPF and the like described in the above embodiments are examples, and are not limited to thereto.

The notation "-or" or "-er" in the above-described embodiments may be replaced to with another notation such as "circuitry," "device," "unit," or "module."

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. Technique of implementing an integrated circuit is not limited to the LSI and may be realized by using a dedicated circuit, a general-purpose processor, or a special-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an embodiment of the present disclosure, includes: reception circuitry, which, in operation, receives control information on buffering for retransmission control; and control circuitry, which, in operation, controls the buffering based on the control information.

In the terminal according to an embodiment of the present disclosure, the control information includes information indicating a priority of the buffering between a plurality of data.

In the terminal according to an embodiment of the present disclosure, the control circuitry, in operation, controls save of the data in a buffer and discard of the data based on the information indicating the priority.

In the terminal according to an embodiment of the present disclosure, when there is no free space in the buffer, the control circuitry, in operation, overwrites data having a lower priority than received data with the received data.

In the terminal according to an embodiment of the present disclosure, when there is no data having the lower priority in the buffer, the control circuitry, in operation, discards the received data.

In the terminal according to an embodiment of the present disclosure, the control information includes information indicating the priority of data relating to new transmission and information indicating whether or not to perform combining processing on data relating to a retransmission request.

In the terminal according to an embodiment of the present disclosure, the control information includes information indicating a priority of the buffering between different data associated with same identification information related to a retransmission control process.

In the terminal according to an embodiment of the present disclosure, the different data associated with the same identification information is transmitted in different periods of a plurality of periods obtained by dividing a time interval corresponding to a propagation delay time of the data.

In the terminal according to an embodiment of the present disclosure, when the data transmitted in a first period is retransmitted in a second period different from the first period of the plurality of periods, the control information for the data retransmitted in the second period includes information indicating that combining processing is not performed on the data retransmitted.

In the terminal according to an embodiment of the present disclosure, the control circuitry, in operation, determines the identification information based on a time resource and an offset value to the time resource.

In the terminal according to an embodiment of the present disclosure, the offset value is determined based on a difference between a number of the time resource corresponding to data relating to new transmission and a number of the time resource corresponding to data relating to retransmission, and the control information for the data relating to the retransmission includes information indicating that combining processing is performed.

In the terminal according to an embodiment of the present disclosure, the offset value is determined based on a difference between a number of the time resource of a first data saved in a buffer of the terminal and a number of the time resource of a second data associated with identification information same as the identification information associated with the first data, and the control information for the second data includes information indicating that buffering of the second data is performed.

In the terminal according to an embodiment of the present disclosure, the terminal further includes: transmission circuitry, which, in operation, collectively transmits response signals for a plurality of data, and the control circuitry, in operation, switches between a first method of transmitting the response signals each including information indicating an error detection result for a corresponding one of the plurality of data and a second method of transmitting the response signals including information on erroneous data of the plurality of data.

In the terminal according to an embodiment of the present disclosure, the control circuitry, in operation, switches between the first method and the second method based on indication from a base station.

In the terminal according to an embodiment of the present disclosure, the control circuitry, in operation, selects one of the first method and the second method in which a number of transmission bits for the response signals is smaller.

A base station according to an embodiment of the present disclosure, includes: control circuitry, which; in operation, generates control information on buffering for retransmission control; and transmission circuitry, which, in operation, transmits the control information.

A receiving method according to an embodiment of the present disclosure, includes the following performed by a terminal: receiving control information on buffering for retransmission control; and controlling the buffering based on the control information.

A transmitting method according to an embodiment of the present disclosure, includes the following performed by a base station: generating control information on buffering for retransmission control; and transmitting the control information.

The disclosure of Japanese Patent Application No. 2019-084513, filed on Apr. 25, 2019, including the specification, drawings and abstract is incorporated herein by reference in its entirety.

INDUSTRIAL APPLICABILITY

One embodiment of the present disclosure is useful for a radio communication system.

REFERENCE SIGNS LIST

100 Base station
101 Contoller
102, 207 Coder and modulator
103, 208 Radio transmitter
104, 201 Antenna
105, 202 Radio receiver
106, 203 Demodulator and decoder
107 ACK/NACK determiner
200 Terminal
704 Soft buffer controller
205 Soft buffer
206 ACK/NACK generator

The invention claimed is:

1. A terminal, comprising:
reception circuitry, which, in operation, receives control information on buffering for retransmission control; and
control circuitry, which, in operation, controls the buffering based on the control information, the control information including information indicating a priority of the buffering between a plurality of data, wherein,
the control circuitry, in operation, controls saving and discarding of data of the plurality of data in a buffer based on the information indicating the priority, wherein,
when there is no free space in the buffer, the control circuitry, in operation, overwrites, with received data, data in the buffer having a lower priority than the received data, and when there is no data having the lower priority in the buffer, the control circuitry, in operation, discards the received data.

2. The terminal according to claim 1, wherein
the control information includes information indicating the priority of data relating to new transmission and information indicating whether or not to perform combining processing on data relating to a retransmission request.

3. The terminal according to claim 1, wherein
the control information includes information indicating a priority of the buffering between different data associated with same identification information related to a retransmission control process.

4. The terminal according to claim 3, wherein
the different data associated with the same identification information is transmitted in different periods of a plurality of periods obtained by dividing a time interval corresponding to a propagation delay time of the data.

5. The terminal according to claim 4, wherein
when the data transmitted in a first period is retransmitted in a second period different from the first period of the plurality of periods, the control information for the data retransmitted in the second period includes information indicating that combining processing is not performed on the data retransmitted.

6. The terminal according to claim 3, wherein
the control circuitry, in operation, determines the identification information based on a time resource and an offset value to the time resource.

7. The terminal according to claim 6, wherein
the offset value is determined based on a difference between a number of the time resource corresponding to data relating to new transmission and a number of the time resource corresponding to data relating to retransmission, and
the control information for the data relating to the retransmission includes information indicating that combining processing is performed.

8. The terminal according to claim 6, wherein
the offset value is determined based on a difference between a number of the time resource of a first data saved in a buffer of the terminal and a number of the time resource of a second data associated with identification information same as the identification information associated with the first data, and
the control information for the second data includes information indicating that buffering of the second data is performed.

9. The terminal according to claim 1, comprising:
transmission circuitry, which, in operation, collectively transmits response signals for a plurality of data, wherein
the control circuitry, in operation, switches between a first method of transmitting the response signals each including information indicating an error detection result for a corresponding one of the plurality of data and a second method of transmitting the response signals including information on erroneous data of the plurality of data.

10. The terminal according to claim 9, wherein
the control circuitry, in operation, switches between the first method and the second method based on indication from a base station.

11. The terminal according to claim 9, wherein
the control circuitry, in operation, selects one of the first method and the second method in which a number of transmission bits for the response signals is smaller.

12. A base station, comprising:
control circuitry, which, in operation, generates control information on buffering for retransmission control; and
transmission circuitry, which, in operation, transmits the control information, the control information including information indicating a priority of the buffering between a plurality of data, wherein saving and discarding of data of the plurality of data in a buffer is controlled based on the information indicating the priority, wherein,
when there is no free space in the buffer, the saving and discarding of data is controlled to overwrite, with received data, data in the buffer having a lower priority than the received data, and
when there is no data having the lower priority in the buffer, the saving and discarding of data is controlled to discard the received data.

13. A receiving method, comprising the following performed by a terminal:
receiving control information on buffering for retransmission control; and
controlling the buffering based on the control information, the control information including information indicating a priority of the buffering between a plurality of data, wherein saving and discarding of data of the plurality of data in a buffer is controlled based on the information indicating the priority, wherein,
when there is no free space in the buffer, the saving and discarding of data is controlled to overwrite, with received data, data in the buffer having a lower priority than the received data, and
when there is no data having the lower priority in the buffer, the saving and discarding of data is controlled to discard the received data.

14. A transmitting method comprising the following performed by a base station:
generating control information on buffering for retransmission control; and
transmitting the control information, the control information including information indicating a priority of the buffering between a plurality of data, wherein saving and discarding of data of the plurality of data in a buffer is controlled based on the information indicating the priority, wherein,
when there is no free space in the buffer, the saving and discarding of data is controlled to overwrite, with received data, data in the buffer having a lower priority than the received data, and
when there is no data having the lower priority in the buffer, the saving and discarding of data is controlled to discard the received data.

* * * * *